United States Patent
Bae et al.

(10) Patent No.: US 8,542,428 B2
(45) Date of Patent: Sep. 24, 2013

(54) ELECTROPHERETIC DISPLAY DEVICE AND METHOD FOR MANUFACTURING THE SAME

(75) Inventors: Ju-Han Bae, Seongnam-si (KR); Byeong-Jin Lee, Yongin-si (KR); Nam-Seok Roh, Seongnam-si (KR); Myung-Hwan Kim, Yongin-si (KR); Sang-Il Kim, Yongin-si (KR); Tae-Hyung Hwang, Seoul (KR); Son-Uk Lee, Seongnam-si (KR); Yu Jin Kim, Busan (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 61 days.

(21) Appl. No.: 13/184,323

(22) Filed: Jul. 15, 2011

(65) Prior Publication Data

US 2012/0218622 A1    Aug. 30, 2012

(30) Foreign Application Priority Data

Feb. 28, 2011    (KR) ................ 10-2011-0017968

(51) Int. Cl.
G02B 26/00    (2006.01)
G09G 3/34    (2006.01)

(52) U.S. Cl.
USPC ..................................... 359/296; 345/107

(58) Field of Classification Search
USPC ............. 359/296; 345/85, 105, 107; 438/28, 438/29, 158; 427/64, 66, 162, 164, 256, 427/266; 29/428, 592.1; 257/40, 59, E21.414, 257/E33.056; 156/60; 445/24
See application file for complete search history.

(56) References Cited

U.S. PATENT DOCUMENTS

| | | | | |
|---|---|---|---|---|
| 6,940,635 | B2 * | 9/2005 | Katase | 359/296 |
| 7,413,765 | B2 * | 8/2008 | Ito et al. | 427/162 |
| 7,459,322 | B2 * | 12/2008 | Ito et al. | 438/29 |
| 7,495,821 | B2 * | 2/2009 | Yamakita et al. | 359/296 |
| 7,511,877 | B2 * | 3/2009 | Kim et al. | 359/296 |
| 7,656,577 | B2 * | 2/2010 | Ban | 359/296 |
| 7,760,418 | B2 * | 7/2010 | Kim et al. | 359/296 |
| 7,834,842 | B2 * | 11/2010 | Ikeda et al. | 345/107 |
| 2006/0052911 | A1 | 3/2006 | Ochs et al. | |
| 2006/0066802 | A1 | 3/2006 | Kitayama | |
| 2011/0157861 | A1 * | 6/2011 | Takaiwa | 361/837 |

(Continued)

FOREIGN PATENT DOCUMENTS

| | | |
|---|---|---|
| JP | 2003-066494 | 3/2003 |
| JP | 2007-156444 | 6/2007 |

(Continued)

OTHER PUBLICATIONS

English Abstract for Publication No. 10-1997-0063344.
English Abstract for Publication No. 2003-066494.
English Abstract for Publication No. 10-2006-0074478.
English Abstract for Publication No. 10-0662197.
English Abstract for Publication No. 10-2007-0008068.
English Abstract for Publication No. 2007-156444.

(Continued)

Primary Examiner — Loha Ben
(74) Attorney, Agent, or Firm — F. Chau & Associates, LLC

(57) ABSTRACT

An electrophoretic display device according to an exemplary embodiment of the present invention includes: a lower substrate; an upper substrate; a thin film transistor disposed on the lower substrate; a pixel electrode connected to the thin film transistor; an electronic ink layer positioned between the lower substrate and the upper substrate; a plurality of partitions disposed on the upper substrate; a reflecting layer disposed on the partitions; a color filter disposed between the partitions.

36 Claims, 34 Drawing Sheets

(56) References Cited

U.S. PATENT DOCUMENTS

| | | | | |
|---|---|---|---|---|
| 2012/0008190 A1* | 1/2012 | Shin et al. | ...................... | 359/296 |
| 2012/0008191 A1* | 1/2012 | Lim et al. | ...................... | 359/296 |
| 2012/0013970 A1* | 1/2012 | Shin et al. | ...................... | 359/296 |

FOREIGN PATENT DOCUMENTS

| | | |
|---|---|---|
| JP | 2008-107749 | 5/2008 |
| JP | 2008-268272 | 11/2008 |
| JP | 2009-276510 | 11/2009 |
| KR | 10-1997-0063344 | 9/1997 |
| KR | 10-2006-0074478 | 7/2006 |
| KR | 10-0662197 | 12/2006 |
| KR | 10-2007-0008068 | 1/2007 |
| KR | 10-2009-0086388 | 8/2009 |

OTHER PUBLICATIONS

English Abstract for Publication No. 2008-107749.
English Abstract for Publication No. 2008-268272.
English Abstract for Publication No. 10-2009-0086388.
English Abstract for Publication No. 2009-276510.

* cited by examiner

ELECTROPHERETIC DISPLAY DEVICE AND METHOD FOR MANUFACTURING THE SAME

CROSS-REFERENCE TO RELATED APPLICATION

This application claims priority to Korean Patent Application No. 10-2011-0017968 filed in the Korean Intellectual Property Office on Feb. 28, 2011, the entire contents of which are incorporated herein by reference.

BACKGROUND OF THE INVENTION (a) Technical Field

The present invention relates to a display, and more particularly, to an electrophoretic display device and a manufacturing method thereof.

(b) Description of the Related Art

Electrophoretic display devices (EPD), which are also known as electronic paper or e-paper displays, are a kind of flat panel display devices that are used in electronic books. EPDs are considered to exhibit excellent contrast and require little to no energy to maintain a static image, which makes such displays well suited for use in electronic book devices.

Among EPDs, an electronic ink type of electrophoretic display device includes two display panels having electric field generation electrodes, and electric ink disposed between the two display panels. The electronic ink contains either a plurality of black positive charged particles and a plurality of white negative charged particles in a microcapsule or the microcapsule contains a plurality of black negative charged particles and a plurality of while positive charged particles. The electrophoretic display device displays an image by moving the white and black charged particles from electronic ink to electrodes having opposite polarities, respectively, by using a potential difference at both ends of the electrodes due to voltages applied to opposite electrodes. The charged particles, so arranged, are capable of reflecting external light.

The electrophoretic display device has high reflectivity and contrast ratio that tends not to be adversely affected by viewing angle. Accordingly, the electrophoretic display device is able to display an image that, like text printed on paper, is comfortable to read. Further, the electrophoretic display device consumes less power because it is able to maintain an image even if a voltage is not continuously applied to the electrodes due to the bi-stable characteristics of the white and black charged particles.

EPDs so arranged tend to be capable of displaying only black and white, however, color EPDs are also used. In color EPDs, a color filter is disposed in the display panel positioned on the electronic ink layer to show colors in the electrophoretic display device.

Meanwhile, the display panel including the color filter and the electronic ink layer are adhered by using an adhesive, and if the interval between the electronic ink and the color filter in which the adhesive resides is too great such that color mixing is generated, characteristics of the color may be deteriorated.

SUMMARY OF THE INVENTION

The present invention increases color accuracy in an electrophoretic display device by preventing the displayed color from being mixed.

An electrophoretic display device according to an exemplary embodiment of the present invention includes: a lower substrate; an upper substrate; a thin film transistor disposed on the lower substrate; a pixel electrode connected to the thin film transistor; an electronic ink layer positioned between the lower substrate and the upper substrate; a plurality of partitions disposed on the upper substrate; a reflecting layer disposed on the partitions; a color filter disposed between the partitions.

The electronic ink layer may include a plurality of spherical microcapsules; and a supporting layer supporting the plurality of spherical microcapsules. Each of the plurality of spherical microcapsules may include a plurality of white charged particles or a plurality of black charged particles therein.

Each of the plurality of spherical microcapsules may include a plurality of white charged particles and a plurality of black charged particles and the white charged particles and the black charged particles may be oppositely charged.

The electronic ink layer may further include a common electrode disposed on the microcapsules.

A groove may be disposed at the upper substrate between the partitions.

The color filter may be positioned at the groove.

The height of each of the plurality of partition may be in the range of 20 to 25 μm.

The reflecting layer may be made of a metal having high reflectivity.

Each of the plurality of the partition may be made of a white photosensitive film.

Each of the plurality of the partition may be made of a black photosensitive film.

An adhesive layer may be disposed on the reflecting layer and the color filter, the adhesive may be apply as a liquid adhesive and adhere an upper panel comprising the upper substrate, the plurality of partitions, the reflecting layer, and the color filter to the electronic ink layer.

The thickness of the adhesive layer may be in the range of 20 to 25 μm.

A manufacturing method of an electrophoretic display device according to an exemplary embodiment of the present invention includes: forming a thin film transistor on a lower substrate; forming a pixel electrode connected to the thin film transistor; forming an electronic ink layer on the pixel electrode; etching an upper substrate to form a groove and a partition; forming a reflecting layer on the partition; forming a color filter in the groove; forming an adhesive layer on the reflecting layer and the color filter; adhering the adhesive layer and the electronic ink layer.

The etching of the upper substrate to form the groove and the partition may include forming a metal pattern on the upper substrate, forming a first photosensitive film on the metal pattern, and etching the upper substrate by using the first photosensitive film as a mask.

The forming of the reflecting layer on the partition may include surface-treating an interior of the groove to form a surface treated portion thereof, forming a second photosensitive film on the surface treated portion of the groove, forming the reflecting layer on the second photosensitive film and the partition, and removing the reflecting layer on the second photosensitive film and the second photosensitive film.

An electrophoretic display device according to an exemplary embodiment of the present invention includes: a lower substrate; a thin film transistor disposed on the lower substrate; a pixel electrode connected to the thin film transistor; an upper substrate facing the lower substrate and including a plurality of partitions and a plurality of grooves disposed between the partitions; a common electrode disposed on the grooves and the partitions; a lateral reflector disposed on the common electrode on the partitions; color filters disposed in the grooves; a plurality of electrically charged particles disposed on the color filters.

The common electrode may include a plurality of cutouts.

A first organic layer may be disposed on the pixel electrode.

A white reflector may be disposed on the first organic layer.

The electrically charged particles may be black electronic particles and a white solvent may be positioned in the groove.

The white reflector may include an opening.

The electrically charged particles may be white electronic particles and a black solvent may be positioned in the grooves.

The electrically charged particles may include white electrically charged particles and black electrically charged particles and a transparent solvent may be positioned in the grooves.

An electrophoretic display device according to an exemplary embodiment of the present invention includes: a lower substrate; an upper substrate; a thin film transistor disposed on the lower substrate; a pixel electrode connected to the thin film transistor; an electronic ink layer positioned on the pixel electrode between the lower substrate and the upper substrate; a lens positioned on the electronic ink layer; and a plurality of color filters disposed on the upper substrate.

The plurality of color filters may be divided into a first color filter and a second color filter.

An opening may be positioned between the first color filter and the second color filter.

A piezoelectric member may be positioned between the lower substrate and the upper substrate.

Each of the color filters may be separated from each other.

A supporting member may be positioned on the lower substrate.

A piezoelectric member may be positioned between the supporting member and the upper substrate.

According to an exemplary embodiment of the present invention, the color filter is positioned in the groove between the partitions, and the reflecting layer is formed on the partitions such that the external light passing through the color filter is prevented from being incident to the color filter of the other colors, thereby preventing color mixing.

Also, the white, the black, and the colors may be realized by using the lens and the piezoelectric member.

BRIEF DESCRIPTION OF THE DRAWINGS

The above and other features and aspects of the exemplary embodiments of the present invention will be described in detail with reference to the accompanying drawings, in which.

DETAILED DESCRIPTION OF THE EMBODIMENTS

Figure 1:
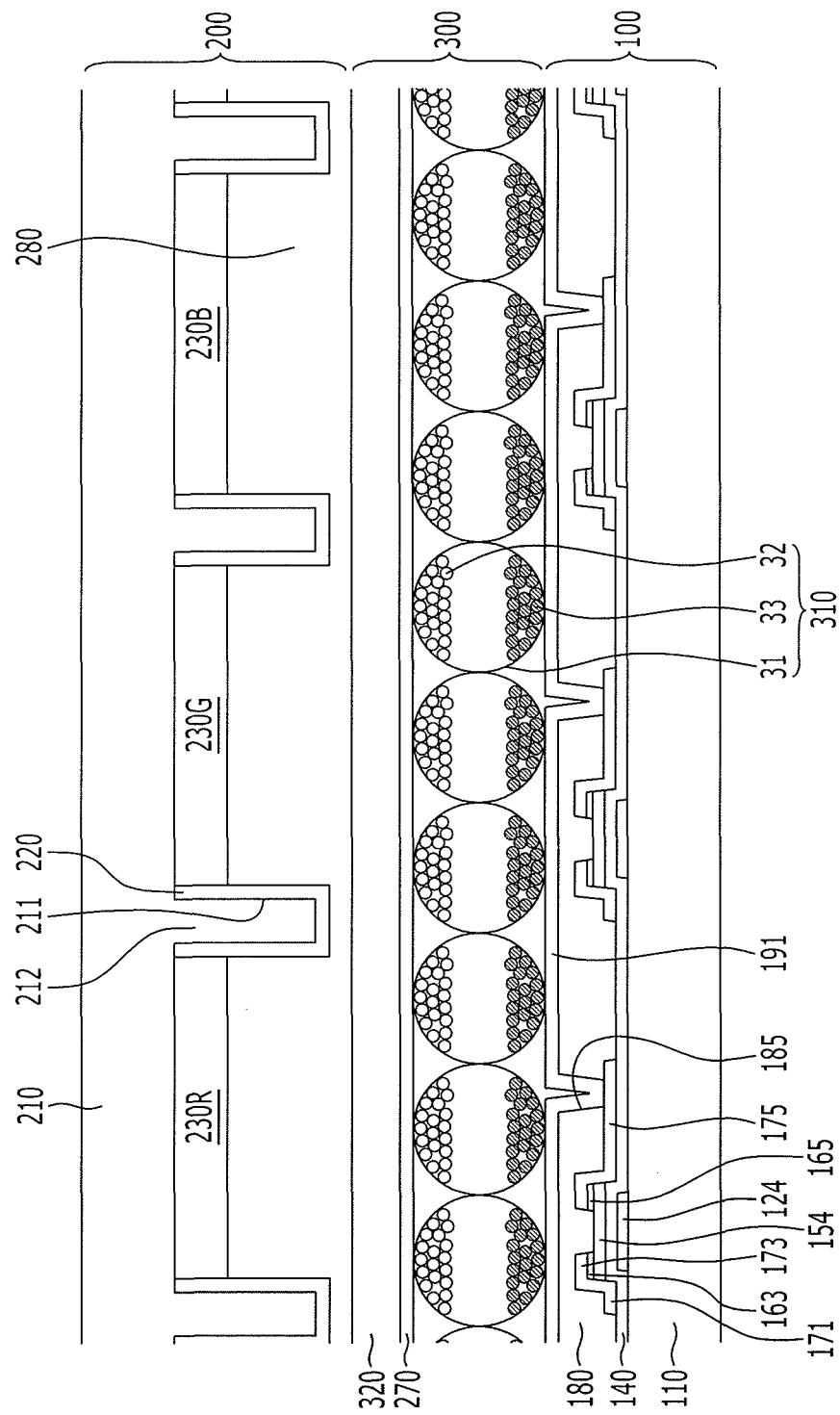
FIG. 1 is a cross-sectional view of an electrophoretic display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the embodiments, like reference numerals may designate like elements throughout the specification.

The sizes and thicknesses of constituent members shown in the accompanying drawings may be exaggerated for better understanding and ease of description. The present invention is not limited to the illustrated sizes and thicknesses.

It will be understood that when an element such as a layer, film, region, or substrate is referred to as being "on" another element, it can be directly on the other element or intervening elements may also be present.

An electrophoretic display device according to an exemplary embodiment of the present invention will be described with reference to FIG. 1.

FIG. 1 is a cross-sectional view of an electrophoretic display device according to an exemplary embodiment of the present invention.

As shown in FIG. 1, an electrophoretic display device includes a lower panel 100 including a lower substrate 110 and a pixel electrode 191 formed thereon, an electronic ink layer 300 disposed on the lower panel 100 and including a plurality of electronic ink units 310, and an upper panel 200 disposed on the electronic ink layer 300 and including color filters 230R, 230G, and 230B and an upper substrate 210.

Hereinafter, the structure of the lower display panel 100 of the electrophoretic display device according to an exemplary embodiment of the present invention is described in more detail with reference to FIG. 1.

As shown in FIG. 1, the lower panel 100 of the electrophoretic display device according to an exemplary embodiment of the present invention includes a gate electrode 124 formed on the lower substrate 110, the gate electrode made of transparent glass or plastic. The gate electrode 124 is connected to a gate line that transmits a gate signal.

A gate insulating layer 140 made of a silicon nitride (SiNx), a silicon oxide (SiOx), or another suitable material is disposed on the gate electrode 124.

A semiconductor 154 made of hydrogenated amorphous silicon (a-Si), polysilicon, or another suitable material is disposed on the gate insulating layer 140. The semiconductor 154 is disposed on the gate electrode 124.

Ohmic contacts 163 and 165 are formed on the semiconductor 154. The ohmic contacts 163 and 165 may be made of a material such as n+ hydrogenated amorphous silicon doped with high-concentration n-type impurities such as phosphorous, or of silicide. The ohmic contacts 163 and 165 are disposed as pairs on the semiconductor 154.

A drain electrode 175 and a source electrode 173 are formed on the ohmic contacts 163 and 165 and the gate insulating layer 140. The source electrode 173 is connected to a data line 171 that transmits a data signal.

The gate electrode 124, the source electrode 173, and the drain electrode 175 form a thin film transistor (TFT) together with the semiconductor 154, and a channel of the thin film transistor is formed at the semiconductor 154 between the source electrode 173 and the drain electrode 175.

A passivation layer 180 is formed on the source electrode 173, the drain electrode 175, and an exposed portion of the semiconductor 154.

The passivation layer 180 has a contact hole 185 exposing the drain electrode 175, and the pixel electrode 191 is formed on the passivation layer 180. The pixel electrode 191 may be made of a transparent conducting material such as ITO and IZO, or a reflective metal such as aluminum, silver, chromium, or alloys thereof.

The pixel electrode 191 is physically and electrically connected to the drain electrode 175 and the source electrode 173 through the contact hole 185.

The plurality of the electronic ink units 310 are disposed within the electronic ink layer 300, and the electronic ink units 310 each include a plurality of white positive charged particles 32 and a plurality of black negative charged particles 33 disposed in a spherical microcapsule 31. The electronic ink units 310 may include a black fluid in the spherical microcapsule 31, and a plurality of white charged particles distributed in the black fluid. In this configuration, the plurality of white charged particles may be charged with positive or negative polarity.

A common electrode 270 made of a transparent conducting material such as ITO and IZO is disposed on the electronic ink units 310. A supporting layer 320 supporting the electronic ink units 310 is formed on the common electrode 270.

The pixel electrode 191 that is supplied with a pixel voltage from the drain electrode 175 applied with the data voltage generates an electric field together with the common electrode 270 that is supplied with a common voltage.

In this configuration, the plurality of white positive charged particles 32 and the plurality of black negative charged particles 33 in the electronic ink units 310 between the two electrodes 191 and 270 are moved to electrodes having opposite polarities, respectively, to faun an image.

When a pixel voltage that is higher than the voltage of the common electrode 270 is applied to the pixel electrode 191, the white positive charged particles 32 move upward such that the white positive charged particles 32 reflect light, thereby showing white, and when a pixel voltage that is lower than the common voltage is applied to the pixel electrode 191, the black negative charged particles 33 move upward such that the black negative charged particles 33 absorb light, thereby showing black.

The upper panel 200 includes the upper substrate 210, the color filters 230R, 230G, and 230B formed on the upper substrate 210, and an adhesive layer 280 formed on the color filters 230R, 230G, and 230B.

The upper substrate 210 includes grooves 211, and the color filters 230R, 230G, and 230B are respectively positioned in the grooves 211. The width of one groove 211 corresponds to one pixel/sub-pixel, and a partition 212 is positioned between the grooves 211.

A reflecting layer 220 made of a metal having high reflectivity is formed on the partition 212. The reflecting layer 220 prevents external light passing through the color filters 230R, 230G, and 230B from being incident to the color filters 230R, 230G, and 230B of other colors. Accordingly, color mixing may be minimized or prevented.

The height of the partition 212 is in the range of 20 to 25 µm.

The adhesive layer 280 is formed on the partition 212 and the color filters 230R, 230G, and 230B, and the adhesive layer 280 adheres the electronic ink layer 300 and the upper panel 200 to each other.

The thickness of the adhesive layer 280 positioned on the color filters 230R, 230G, and 230B is in the range of 20 to 25 µm. This thickness may minimize a space on the partition 212 when combining the upper panel 200 and the electronic ink layer 300. Accordingly, the path of light is reduced.

Next, a manufacturing method of an upper panel of an electrophoretic display device according to an exemplary embodiment of the present invention will be described with reference to FIG. 2 to FIG. 5.

FIG. 2 to FIG. 5 are cross-sectional views sequentially showing a manufacturing method of an upper panel of an electrophoretic display device according to an exemplary embodiment of the present invention.

Figure 2:
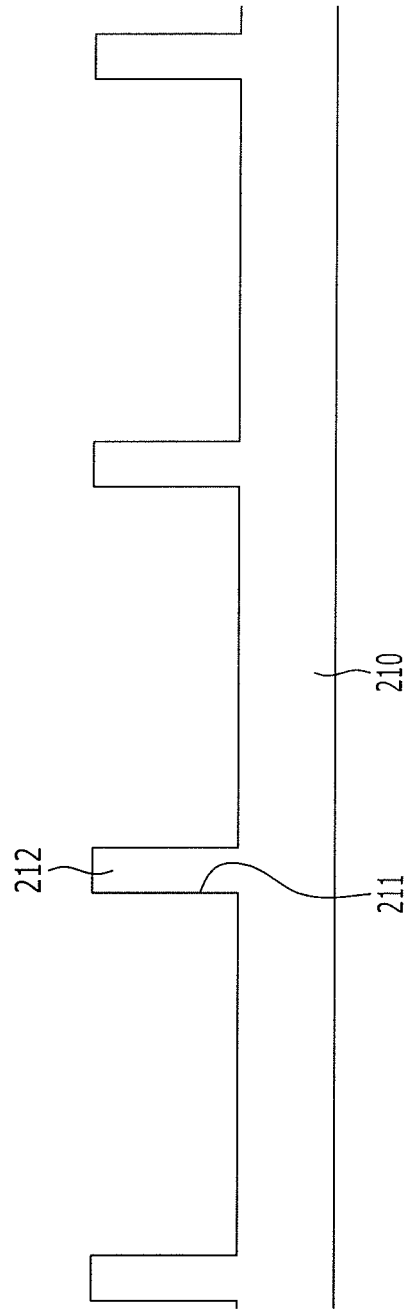
FIG. 2 to FIG. 5 are cross-sectional views sequentially showing a manufacturing method of an upper panel of an electrophoretic display device according to an exemplary embodiment of the present invention.

Firstly, as shown in FIG. 2, the groove 211 and the partition 212 are formed on the upper substrate 210. The groove 211 may be understood to be the space between proximate partitions 212. Here, the width of the groove 211 corresponds to the width of one pixel/sub-pixel. For example, where a pixel is understood to be one point of light on the display of any color, the width of the groove 211 may be understood to correspond to the width of one pixel. Where a pixel is understood to correspond to a cluster of points of different colors and each constituent point of a particular color is understood to comprise a sub-pixel, the width of the groove 211 may be understood to correspond to the width of one sub-pixel.

Figure 3:
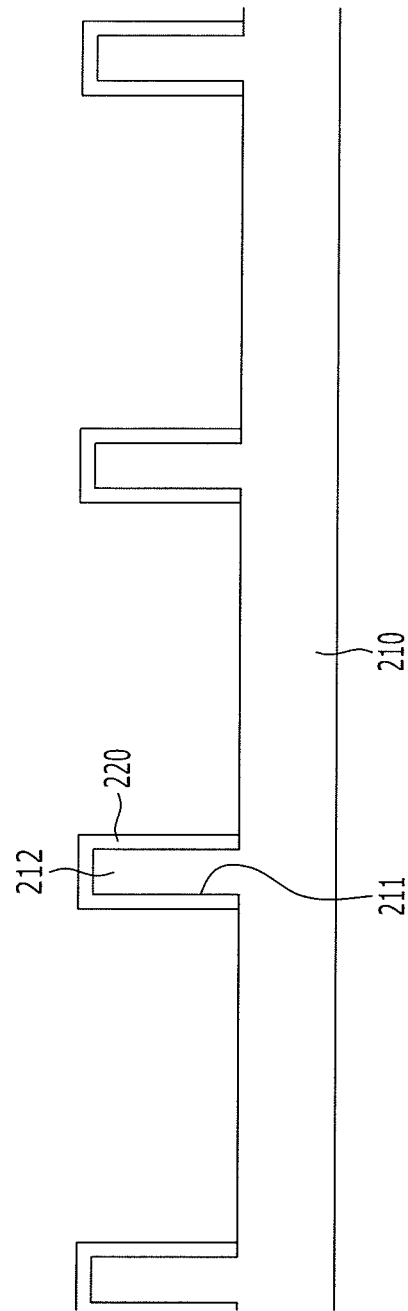

Next, as shown in FIG. 3, the reflecting layer 220 is formed on the partition 212. The reflecting layer 220 may be made of a reflective substance such as a metal having high reflectivity in the spectrum of visible light.

Figure 4:
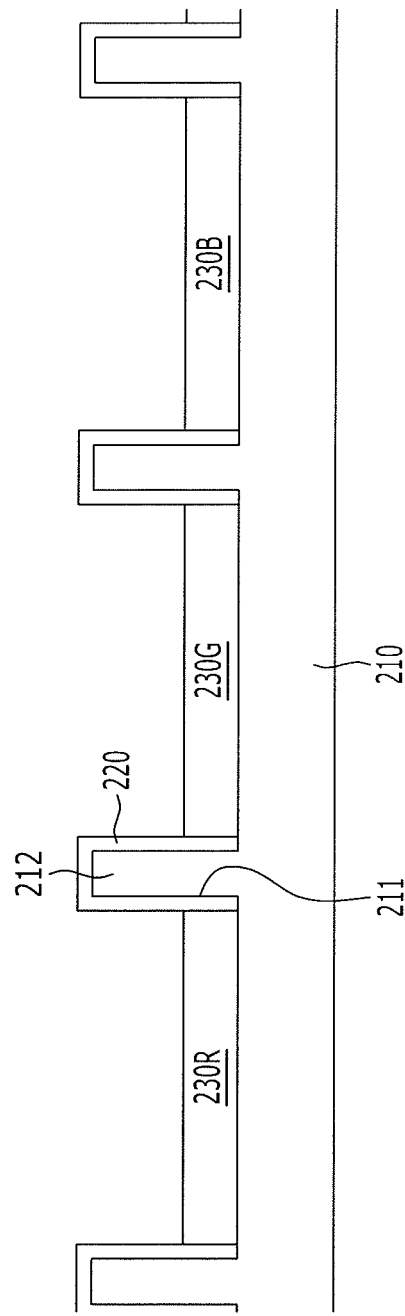

Next, as shown in FIG. 4, color filters 230R (red), 230G (green), and 230B (blue) are respectively formed in each groove 211. The color filters 230R, 230G, and 230B may be formed by an Inkjet method. The pattern by which the red, green, and blue color filters are arranged may be selected according to a desired sub-pixel matrix scheme.

Figure 5:
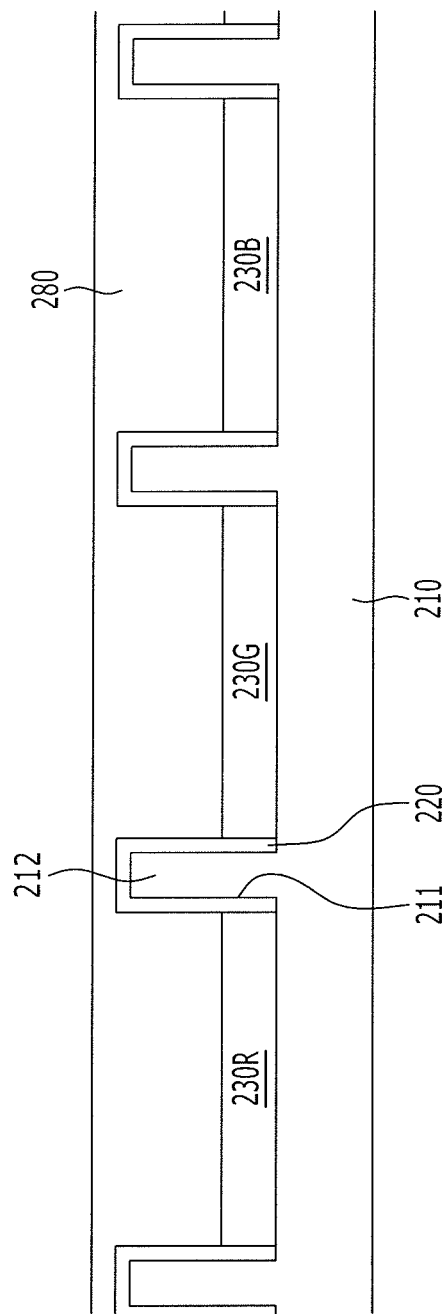

Next, as shown in FIG. 5, the adhesive layer 280 is formed on the color filters 230R, 230G, and 230B and the reflecting layer 220.

Next, the upper panel 200 is adhered to the electronic ink layer 300 attached to the lower panel 100.

Also, the upper panel of the electrophoretic display device according to the first exemplary embodiment of the present invention may be manufactured by another method.

A manufacturing method of an upper panel of an electrophoretic display device according to an exemplary embodiment of the present invention will be described with reference to FIG. 6 to FIG. 12.

FIG. 6 to FIG. 12 are cross-sectional views sequentially showing another manufacturing method of an upper panel of an electrophoretic display device according to an exemplary embodiment of the present invention.

Figure 6:
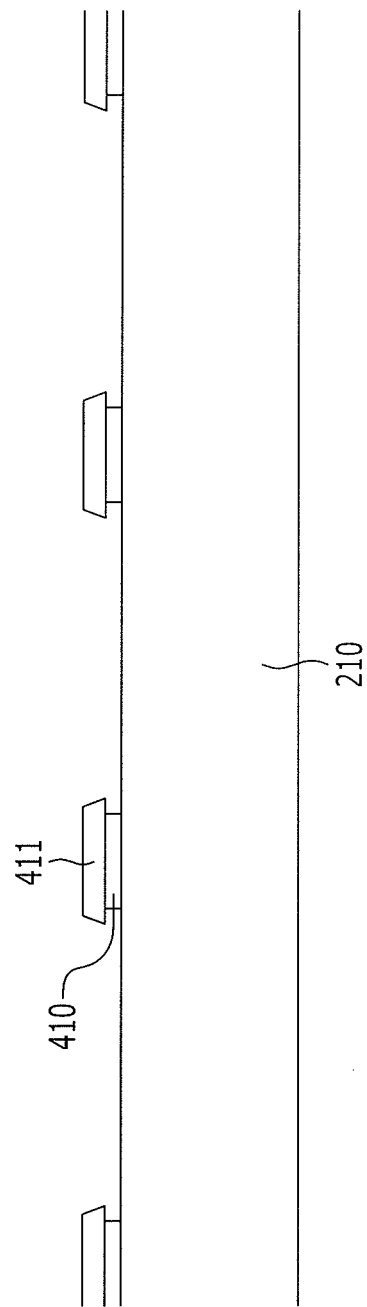
FIG. 6 to FIG. 12 are cross-sectional views sequentially showing a manufacturing method of an upper panel of an electrophoretic display device according to an exemplary embodiment of the present invention.

Firstly, as shown in FIG. 6, a metal layer such as chromium (Cr) is formed on an upper substrate 210, and the metal layer is patterned to form a metal layer pattern 410. The interval of each metal layer pattern 410 (the distance between the centers of proximate metal layer patterns 410) corresponds to the width of one pixel. A first photosensitive film 411 is formed on each metal layer pattern 410.

Figure 7:
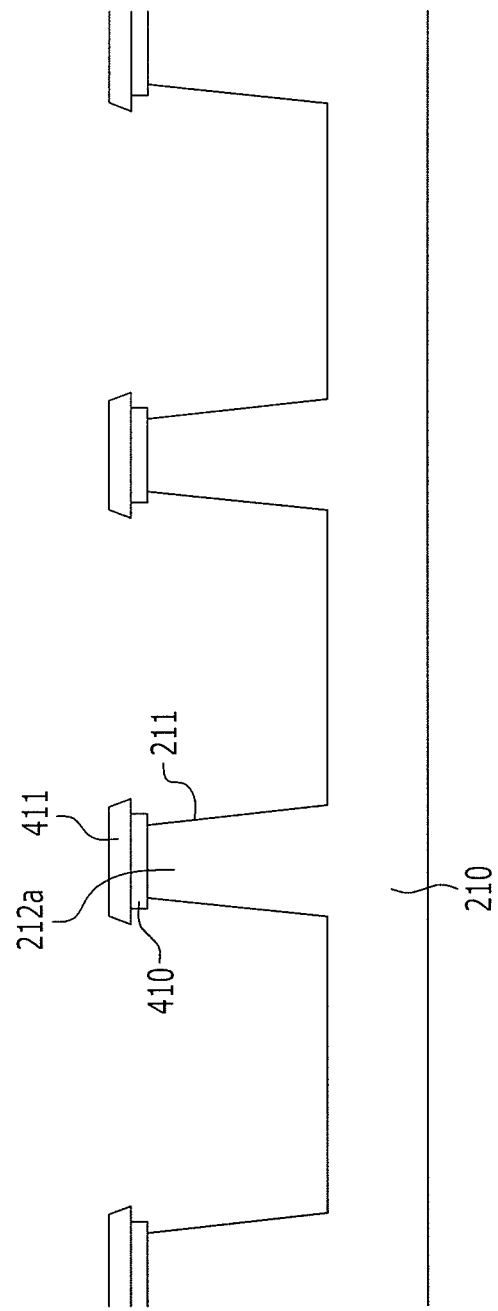

Next, as shown in FIG. 7, the upper substrate 210 is etched by using the first photosensitive film 411 as a mask to form a groove 211 and a first partition 212a.

Figure 8:
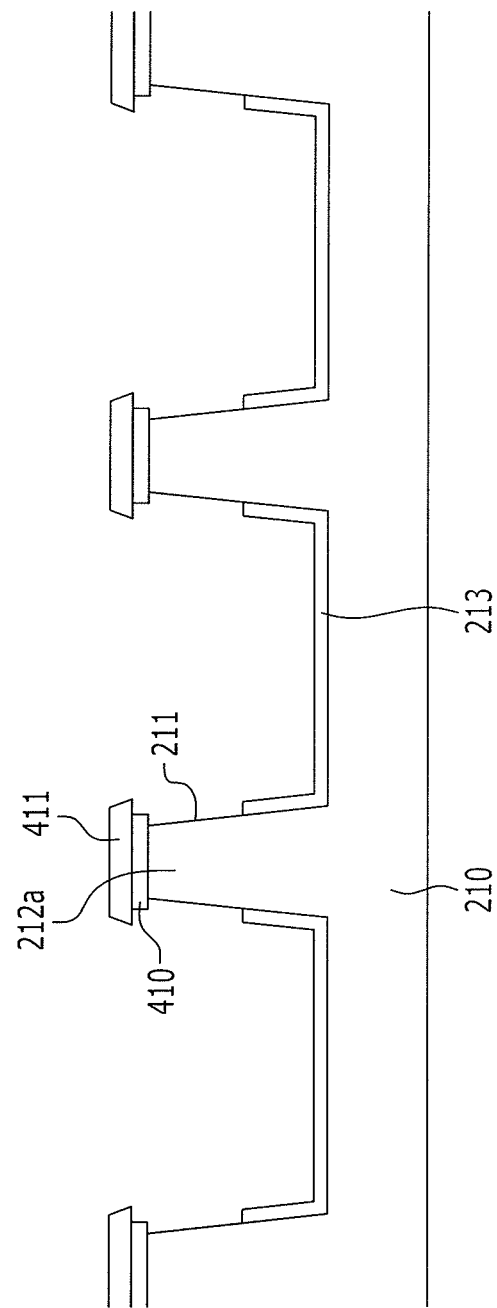

Next, as shown in FIG. 8, the inner part of the groove 211 is surface-treated to form a surface treated portion 213. This surface treatment functions to gather the ink of color filters 230R, 230G, and 230B that will be formed later.

Figure 9:
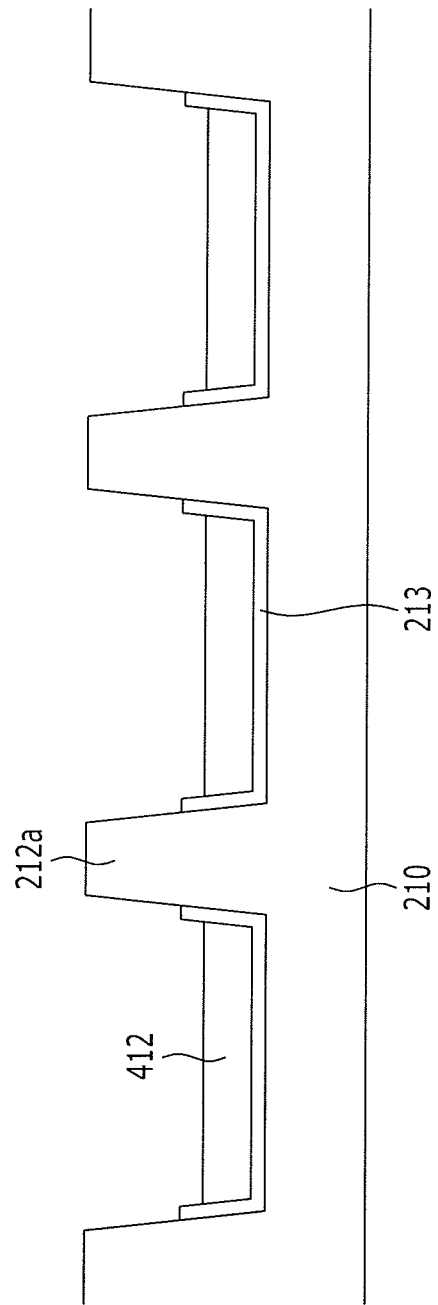

Next, as shown in FIG. 9, after the metal layer pattern 410 and the first photosensitive film 411 on the first partition 212a are removed, a second photosensitive film 412 is formed on the surface treated portion 213.

Figure 10:
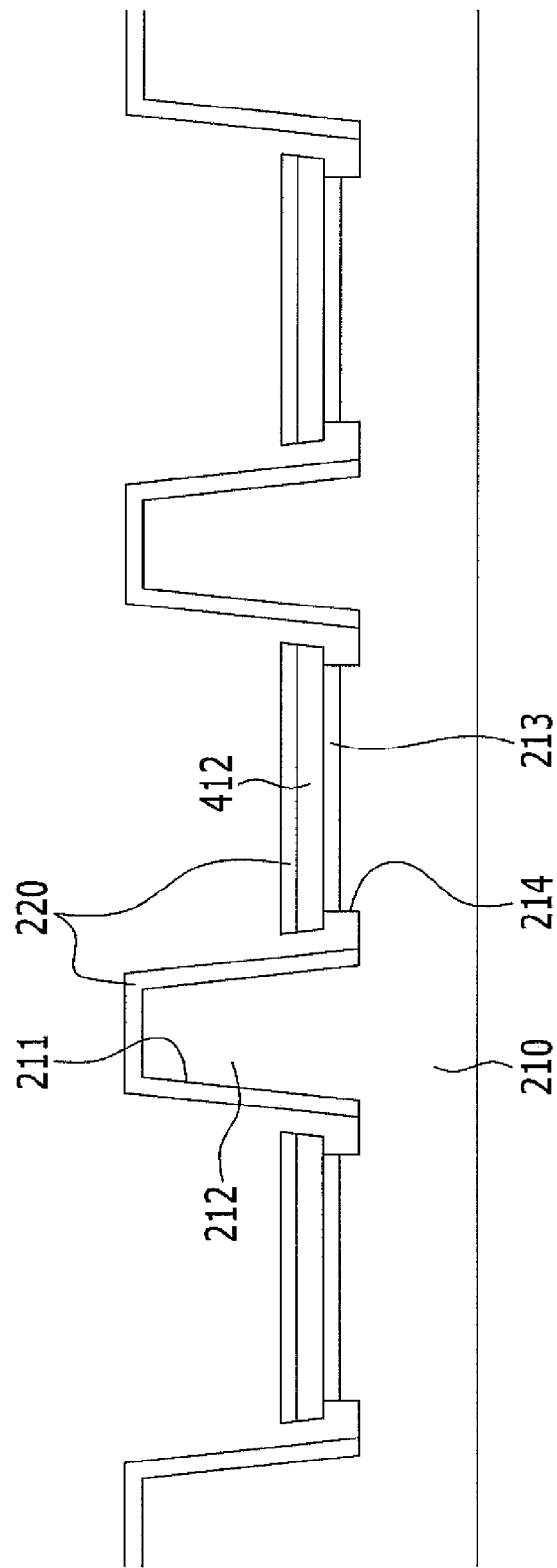

Next, as shown in FIG. 10, the whole surface of the upper substrate 210 is etched by using the second photosensitive film 412 as a mask to form a partition 212 and an undercut 214. Next, a reflecting layer 220 is formed on the whole surface of the upper substrate 210.

Figure 11:
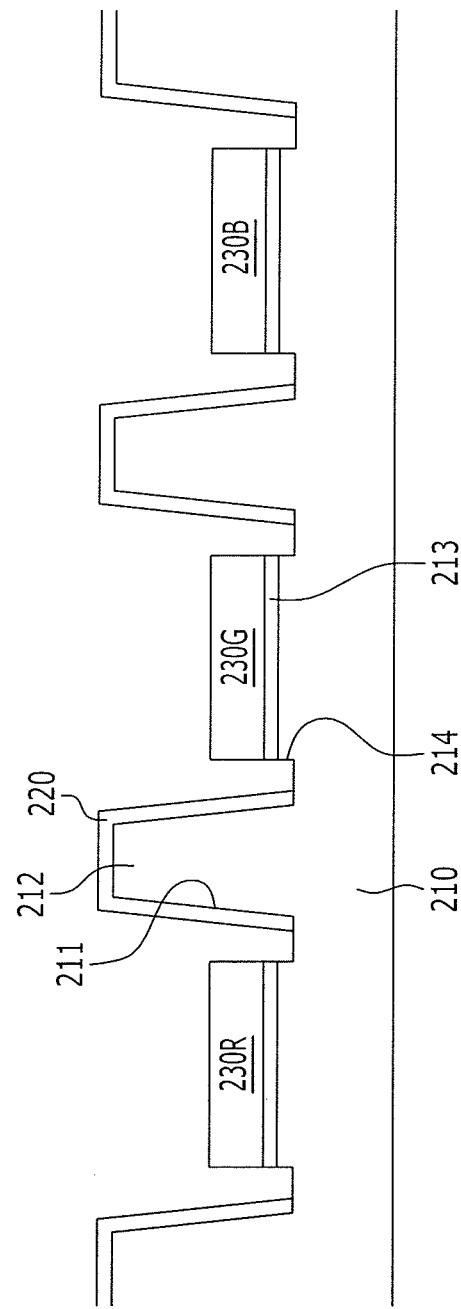

Next, as shown in FIG. 11, after the second photosensitive film 412 is removed, for example, through a lift-off process, color filters 230R, 230G, and 230B are formed on the surface treated portion 213. The color filters 230R, 230G, and 230B may be formed by the Inkjet method.

As described above, if the second photosensitive film 412 is removed through the lift-off process, the reflecting layer 220 on the second photosensitive film 412 is also removed such that a process to remove the reflecting layer 220 on the second photosensitive film 412 is not necessary.

Figure 12:
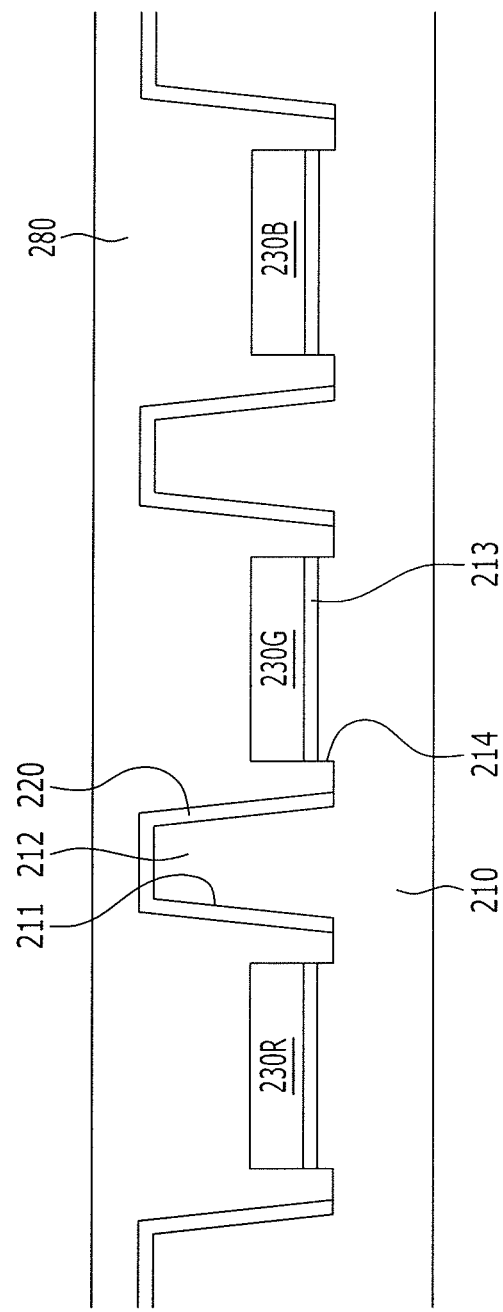

Next, as shown in FIG. 12, an adhesive layer 280 is formed on the color filters 230R, 230G, and 230B and the reflecting layer 220.

Next, the upper panel 200 is adhered to the electronic ink layer 300 attached to the lower panel 100.

An electrophoretic display device according to an exemplary embodiment of the present invention will be described with reference to FIG. 13.

Figure 13:
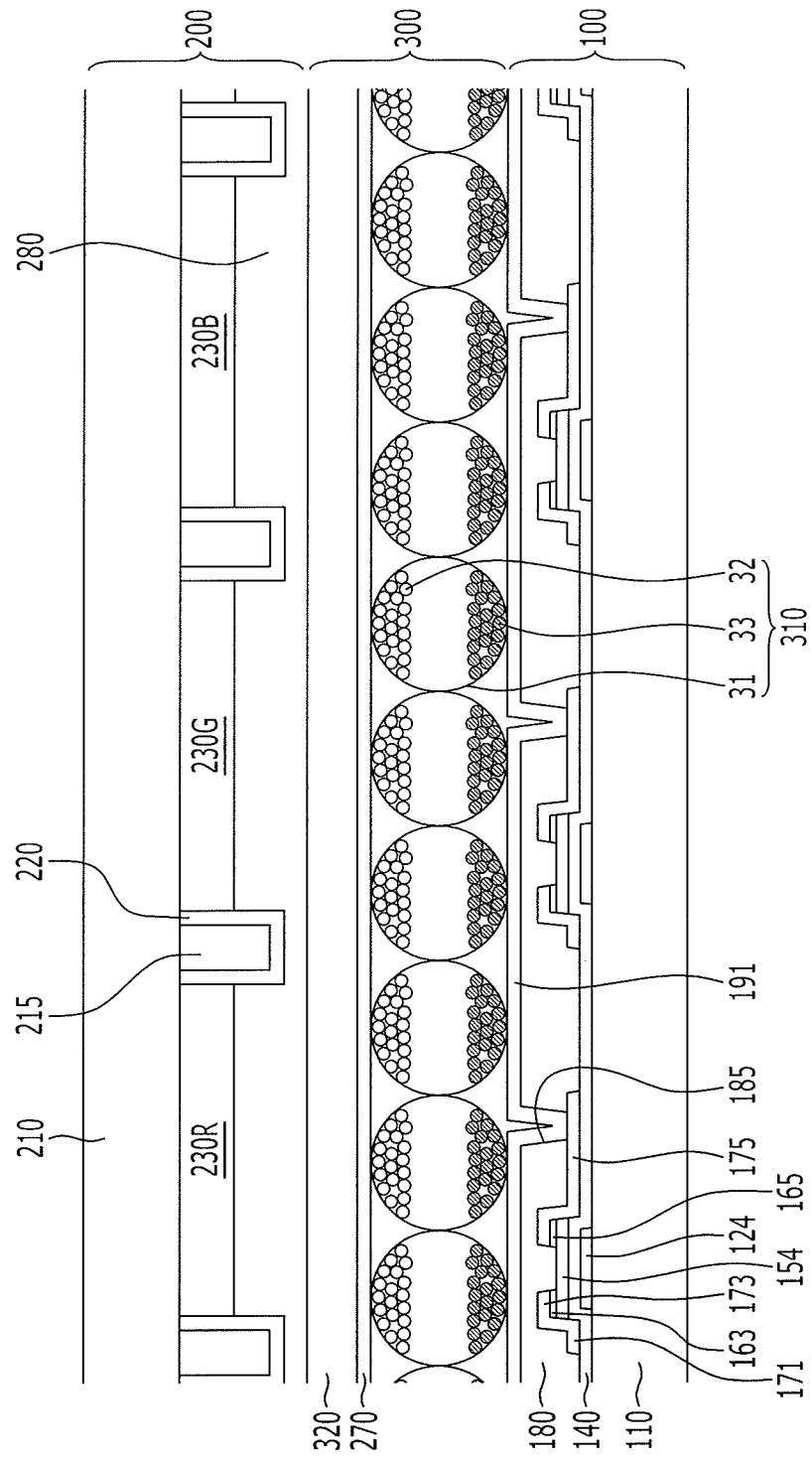
FIG. 13 is a cross-sectional view of an electrophoretic display device according to an exemplary embodiment of the present invention.

FIG. 13 is a cross-sectional view of an electrophoretic display device according to an exemplary embodiment of the present invention.

The electrophoretic display device according to an exemplary embodiment is substantially the same as the electrophoretic display device described above with respect to FIG. 1 except for the upper panel.

As shown in FIG. 13, the upper panel 200 includes an upper substrate 210, a second partition 215 and color filters 230R, 230G, and 230B formed on the upper substrate 210, a reflecting layer 220 formed on the second partition 215, and an adhesive layer 280 formed on the reflecting layer 220 and the color filters 230R, 230G, and 230B.

The interval of each second partition 215 corresponds to the width of one pixel/sub-pixel, and the color filters 230R, 230G, and 230B are positioned between the second partitions 215.

Here, the second partitions 215 may be formed of a white photosensitive film or a black photosensitive film. When forming the second partitions 215 with the white photosensitive film, the white luminance of the resulting display device may be increased, and when forming the second partitions 215 with the black photosensitive film, the contrast and the color characteristics may be increased.

The reflecting layer 220 formed on the second partition 215 is made of a metal having high reflectivity. Here, the reflecting layer 220 prevents the external light passing through the color filters 230R, 230G, and 230B from being incident to the color filters 230R, 230G, and 230B of other colors. Accordingly, particular rays of light are prevented from passing through more than one color filter 230R, 230G, and 230B. The color mixing problem is solved by the reflecting layer 220 such that color characteristics may be increased.

The adhesive layer 280 is formed on the reflecting layer 220 and the color filters 230R, 230G, and 230B by coating a liquid adhesive.

Next, an electrophoretic display device according to an exemplary embodiment of the present invention will be described with reference to FIG. 14 to FIG. 22.

Figure 14:
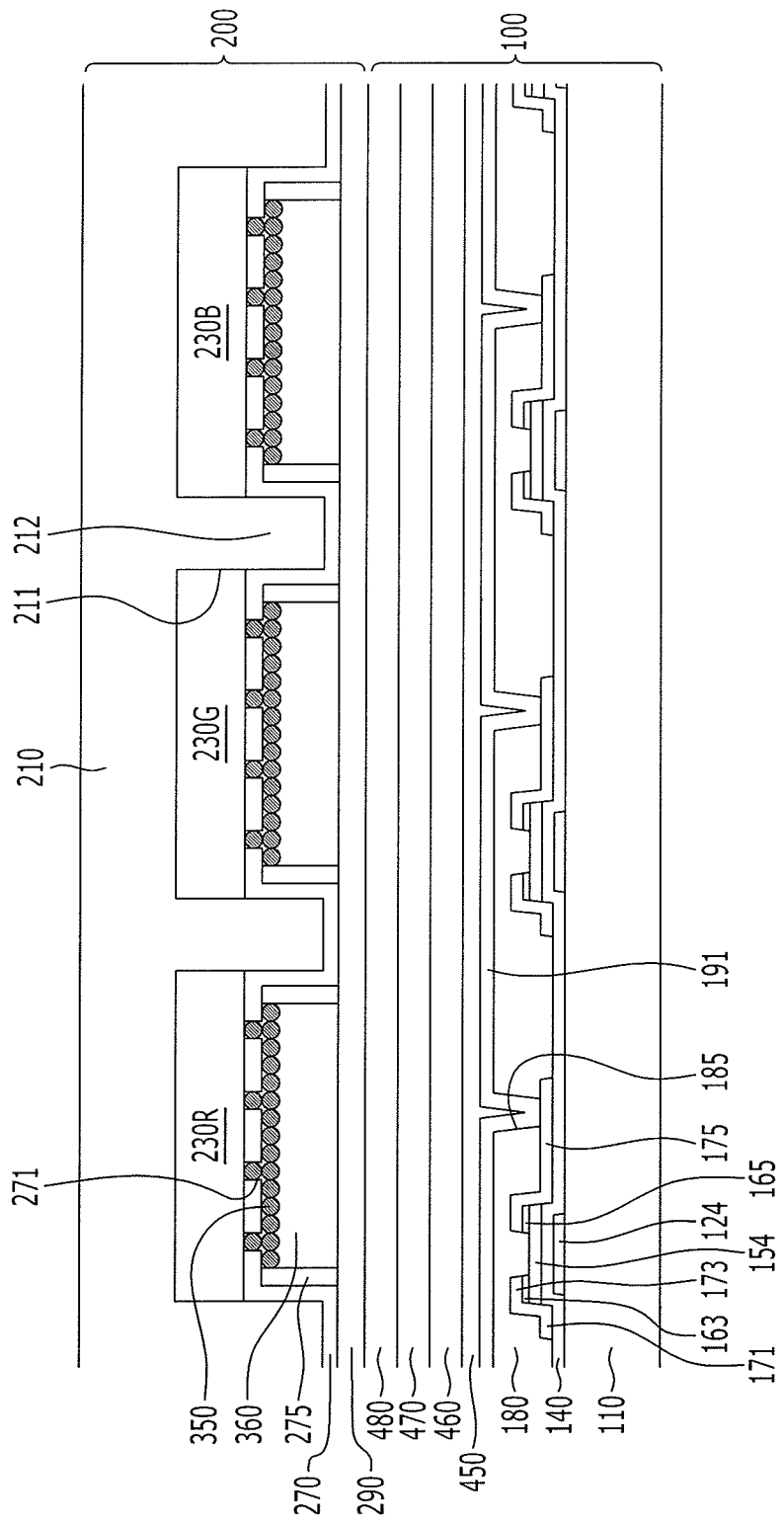
FIG. 14, FIG. 15, and FIG. 22 are cross-sectional views of an electrophoretic display device according to an exemplary embodiment of the present invention.
Figure 15:
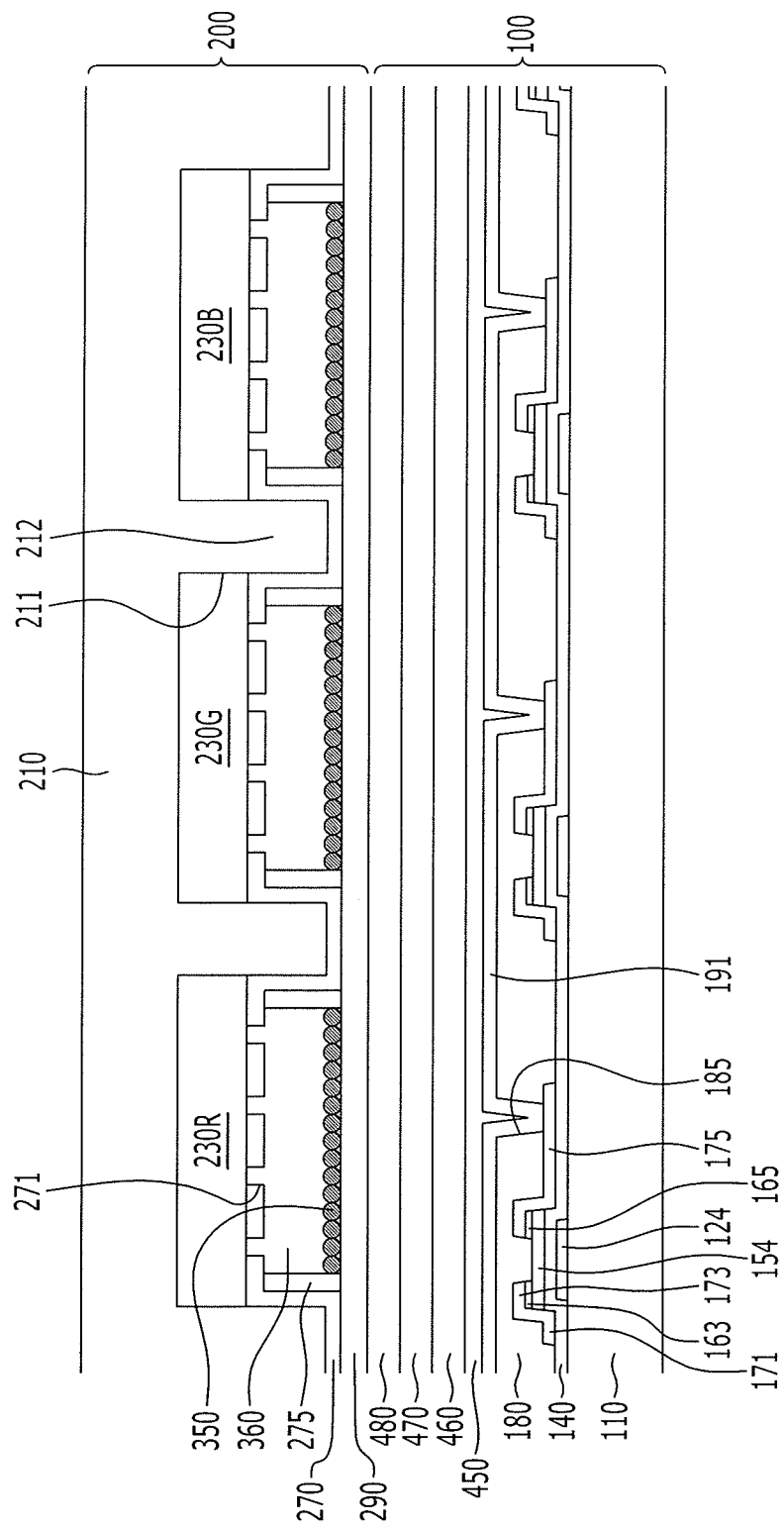
Figure 22:
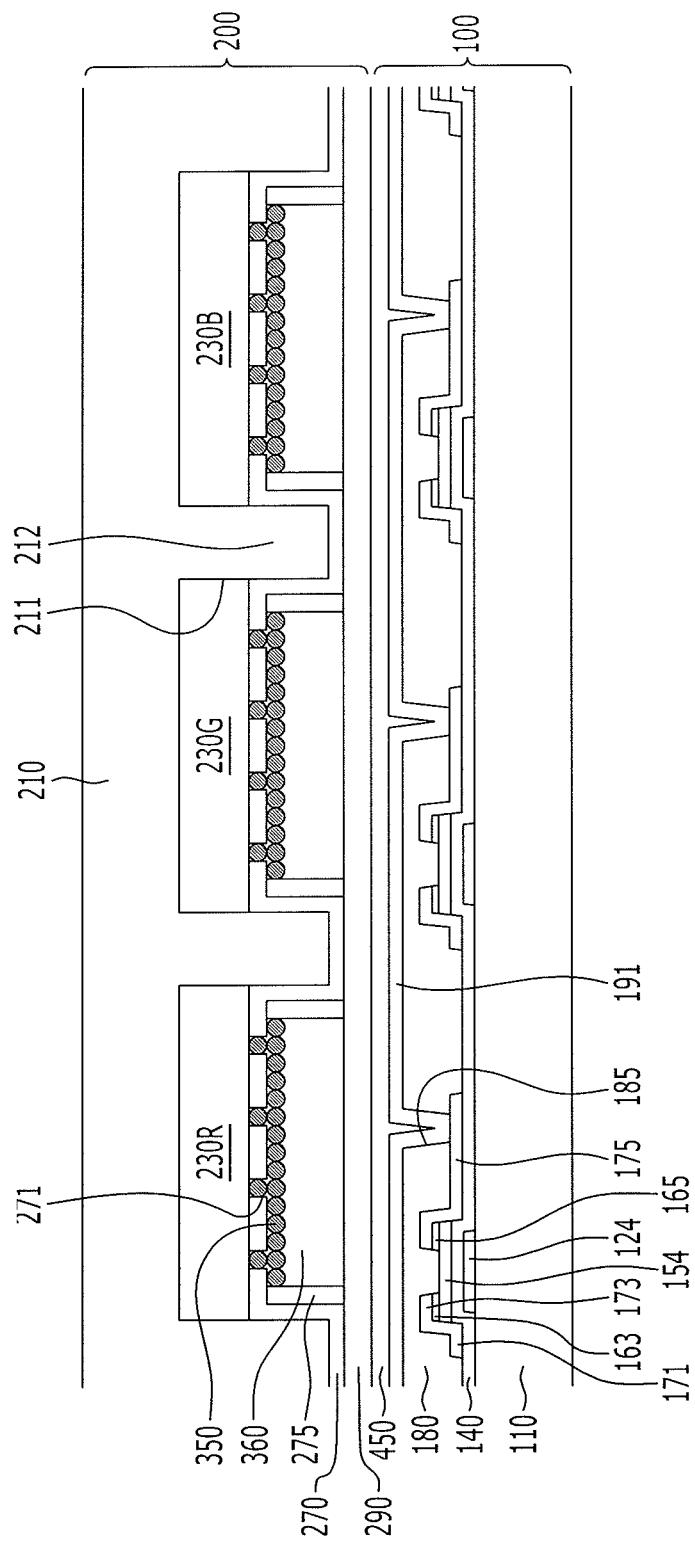

FIG. 14, FIG. 15, and FIG. 22 are cross-sectional views of an electrophoretic display device according an exemplary embodiment of the present invention.

As shown in FIG. 14 and FIG. 15, the electrophoretic display device according to an exemplary embodiment does not have the electronic ink layer. Accordingly, the electrophoretic display device depicted in FIGS. 14 and 15 is different from the electrophoretic display device depicted in FIGS. 1-13. The electrophoretic display device depicted in FIGS. 14 and 15 includes a lower panel 100 formed with a thin film transistor and the upper panel 200 formed with the color filters 230R, 230G, and 230B and black electronic particles 350.

The structure of the lower panel 100 is the same as that of the lower panel described above with respect to FIG. 1 except for a structure of a first organic layer 450, a metal reflector 460, a second organic layer 470, and a white reflector 480 that are sequentially formed on the pixel electrode 191.

The upper panel 200 includes the upper substrate 210, the color filters 230R, 230G, and 230B formed on the upper substrate 210, the common electrode 270 positioned on the color filters 230R, 230G, and 230B, a lateral reflector 275 positioned on the common electrode 270, a white solvent 360, black electronic particles 350, and a sealant layer 290 positioned on the common electrode 270 and the white solvent 360.

The white reflector 480 of the lower panel 100 and the sealant layer 290 of the upper panel 200 are adhered together.

Grooves 211 are formed at the upper substrate 210, and the color filters 230R, 230G, and 230B are positioned in each groove 211. The width of one groove 211 corresponds to one pixel, and the partitions 212 are positioned between the grooves 211.

Also, the white solvent 360 and a plurality of black electronic particles 350 are formed on the color filters 230R, 230G, and 230B of each groove 211. The black electronic particles 350 may move in the white solvent 360.

The lateral reflector 275 made of a metal having high reflectivity is formed on the common electrode 270 corresponding to the side of the partition 212. The lateral reflecting layer 275 prevents the external light passing through the color filters 230R, 230G, and 230B from being incident to the color filters 230R, 230G, and 230B of other colors. Accordingly, color mixing is reduced or eliminated by the lateral reflecting layer 275 such that color characteristics may be increased.

The common electrode 270 includes a plurality of cutouts 271. The uniformity of the distribution of the black electronic particles 350 may be increased by the cutouts 271.

As shown in FIG. 14, if the black electronic particles 350 positioned in each groove 211 are disposed at the boundary of the common electrode 270 and the white solvent 360, external light is not reflected such that black is displayed.

As shown in FIG. 15, if the black electronic particle 350 positioned in each groove 211 are dispose at the boundary of the sealant layer 290 and the white solvent 360, the external light is reflected such that colors are displayed.

Next, the manufacturing method of the electrophoretic display device according to an exemplary embodiment of the present invention will be described with reference to FIG. 16 to FIG. 21.

FIG. 16 to FIG. 21 are cross-sectional views sequentially showing a manufacturing method of an upper panel of an electrophoretic display device according to an exemplary embodiment of the present invention.

Figure 16:
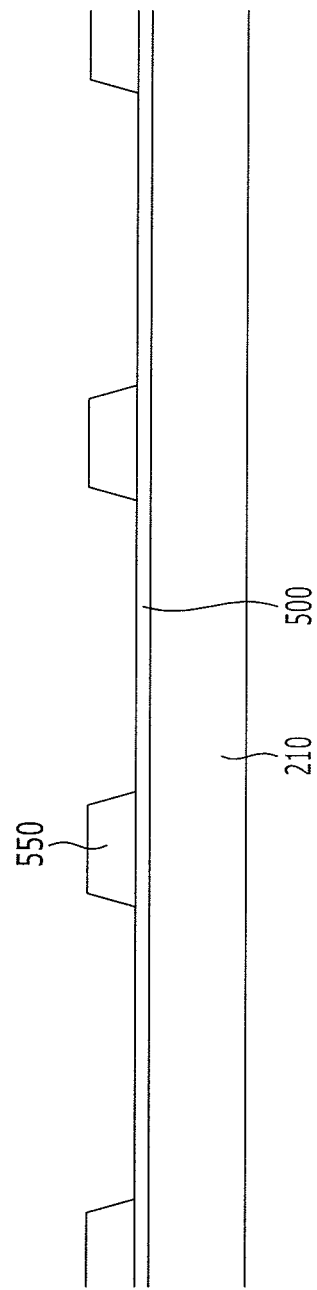
FIG. 16 to FIG. 21 are cross-sectional views sequentially showing a manufacturing method of an upper panel of an electrophoretic display device according to an exemplary embodiment of the present invention.

Firstly, as shown in FIG. 16, after a metal layer 500 such as chromium (Cr) is formed on the upper substrate 210, a third photosensitive film 550 is formed on the metal layer 500.

Figure 17:
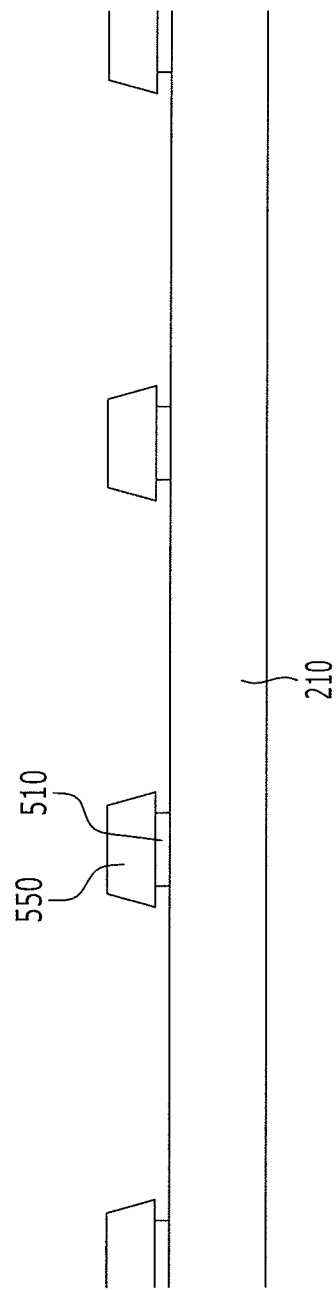

Next, as shown in FIG. 17, the metal layer 500 is etched by using the third photosensitive film 550 as a mask to form a metal layer pattern 510. Here, the interval of each metal layer pattern 510 corresponds to the width of one pixel.

Figure 18:
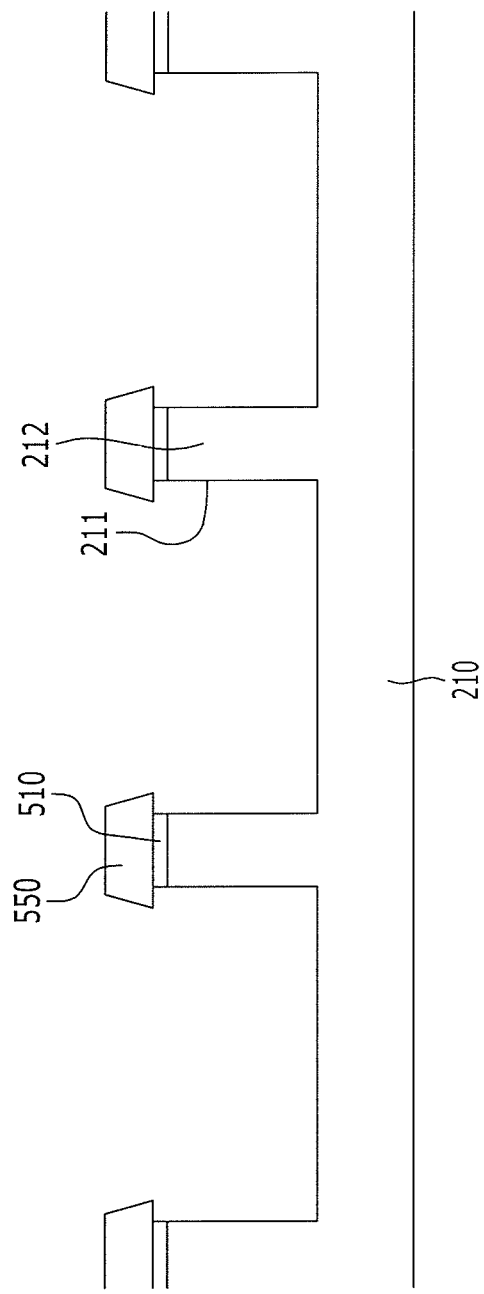

Next, as shown in FIG. 18, the upper substrate 210 is etched by using the third photosensitive film 550 and the metal layer pattern 510 as a mask to form the groove 211 and the partition 212.

Figure 19:
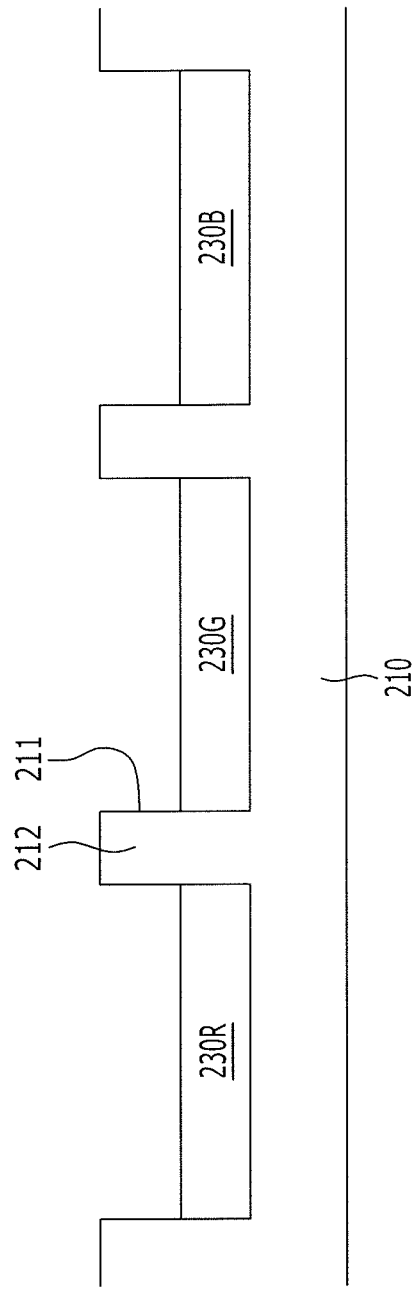

Next, as shown in FIG. 19, the third photosensitive film 550 and the metal layer pattern 510 are removed, and the color filters 230R, 230G, and 230B are formed in the groove 211.

Figure 20:
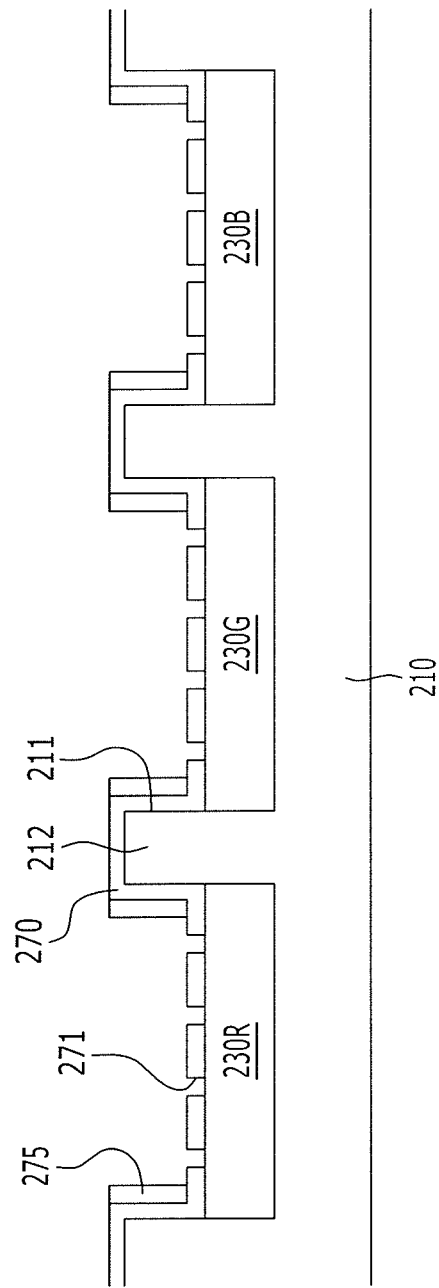

Next, as shown in FIG. 20, a common electrode 270 is formed on the color filters 230R, 230G, and 230B and the partition 212. Here, the common electrode 270 on the color filters 230R, 230G, and 230B has a plurality of cutouts 271. Also, the lateral reflector 275 is formed on the common electrode 270 corresponding to the side of the partition 212.

Figure 21:
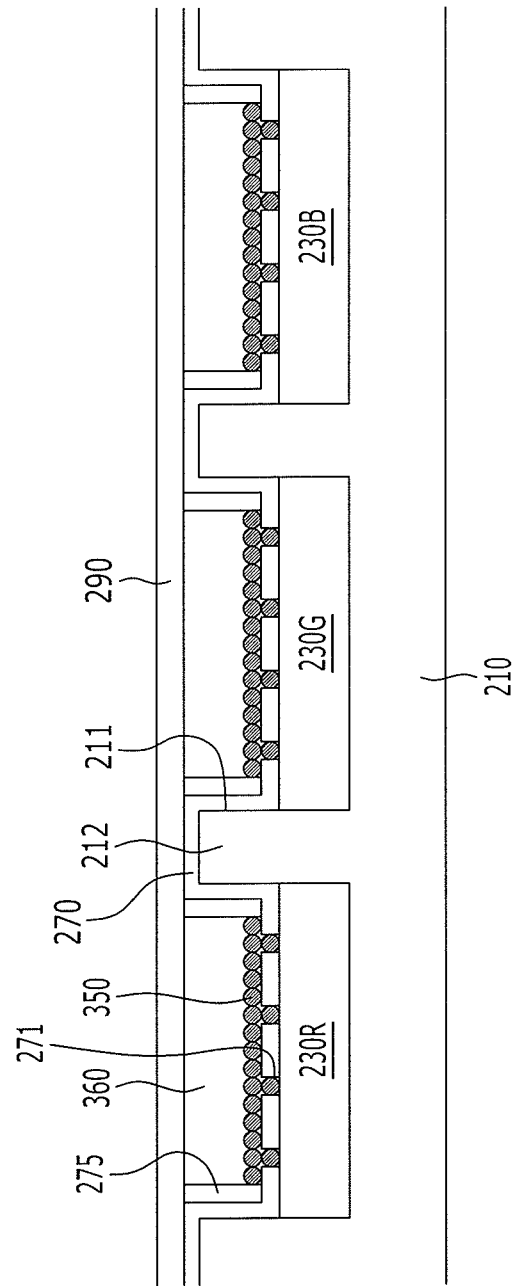

Next, as shown in FIG. 21, the white solvent 360 and a plurality of black electronic particles 350 are formed on the color filters 230R, 230G, and 230B in the groove 211, and the sealant layer 290 positioned on the common electrode 270 and the white solvent 360 is formed.

As, the electrophoretic display device discussed above with respect to FIGS. 16-21 may not have a white reflector, as shown in FIG. 22, the first organic layer 450 of the lower panel 100 and the sealant layer 290 of the upper panel 200 may be adhered together.

An electrophoretic display device according to an exemplary embodiment of the present invention will now be described with reference to FIG. 23 to FIG. 25.

Figure 23:
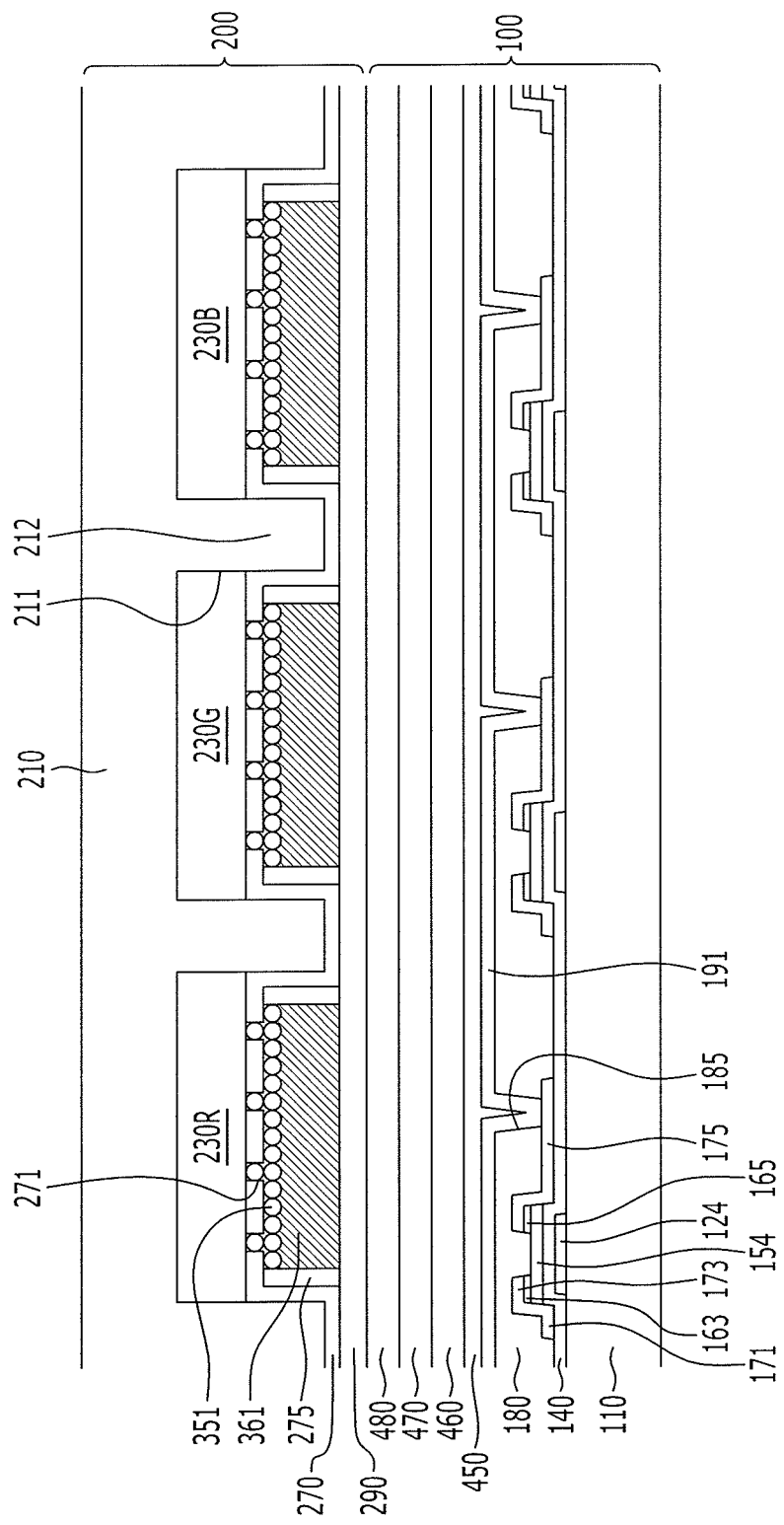
FIG. 23 to FIG. 25 are cross-sectional views of an electrophoretic display device according to an exemplary embodiment of the present invention.
Figure 24:
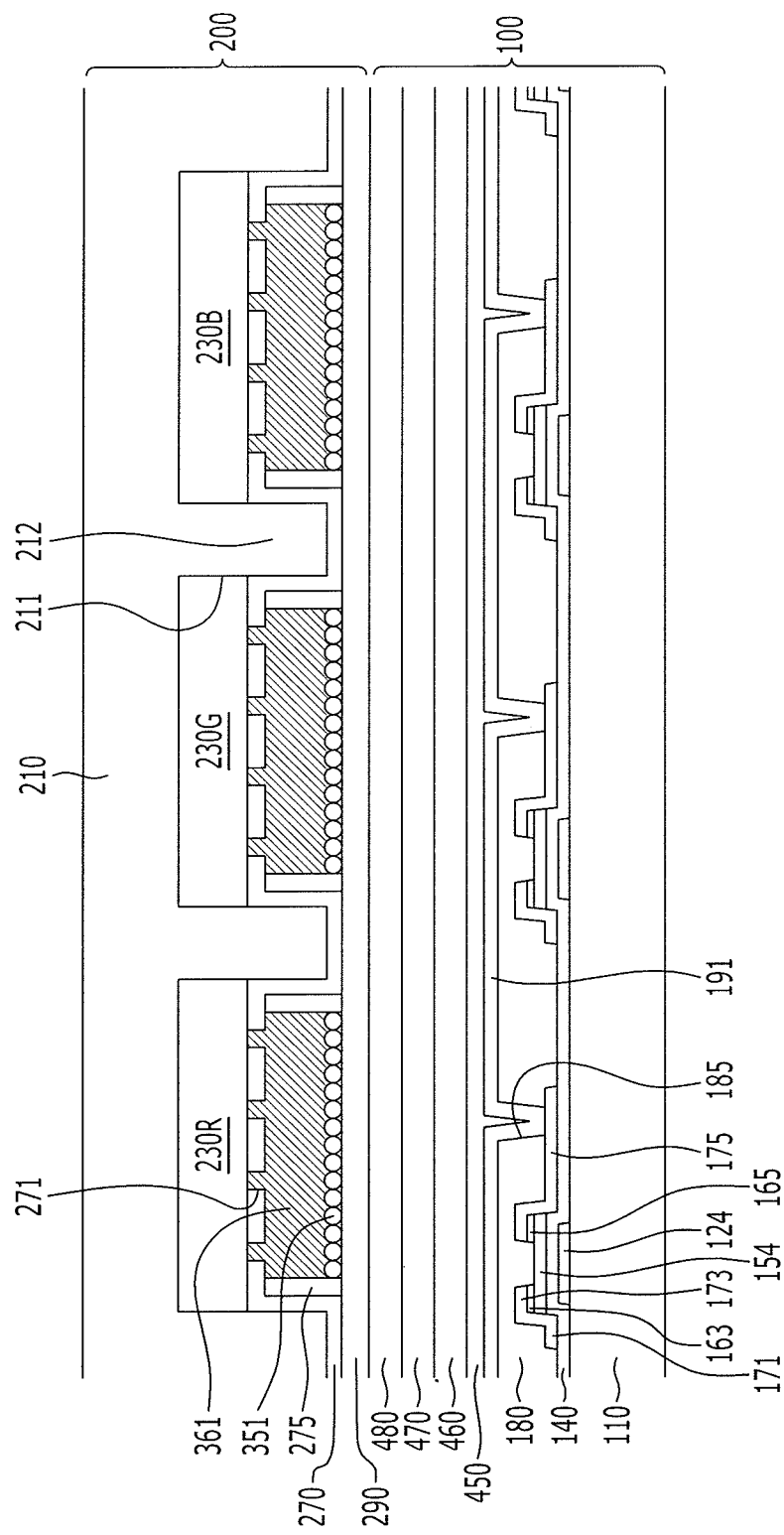
Figure 25:
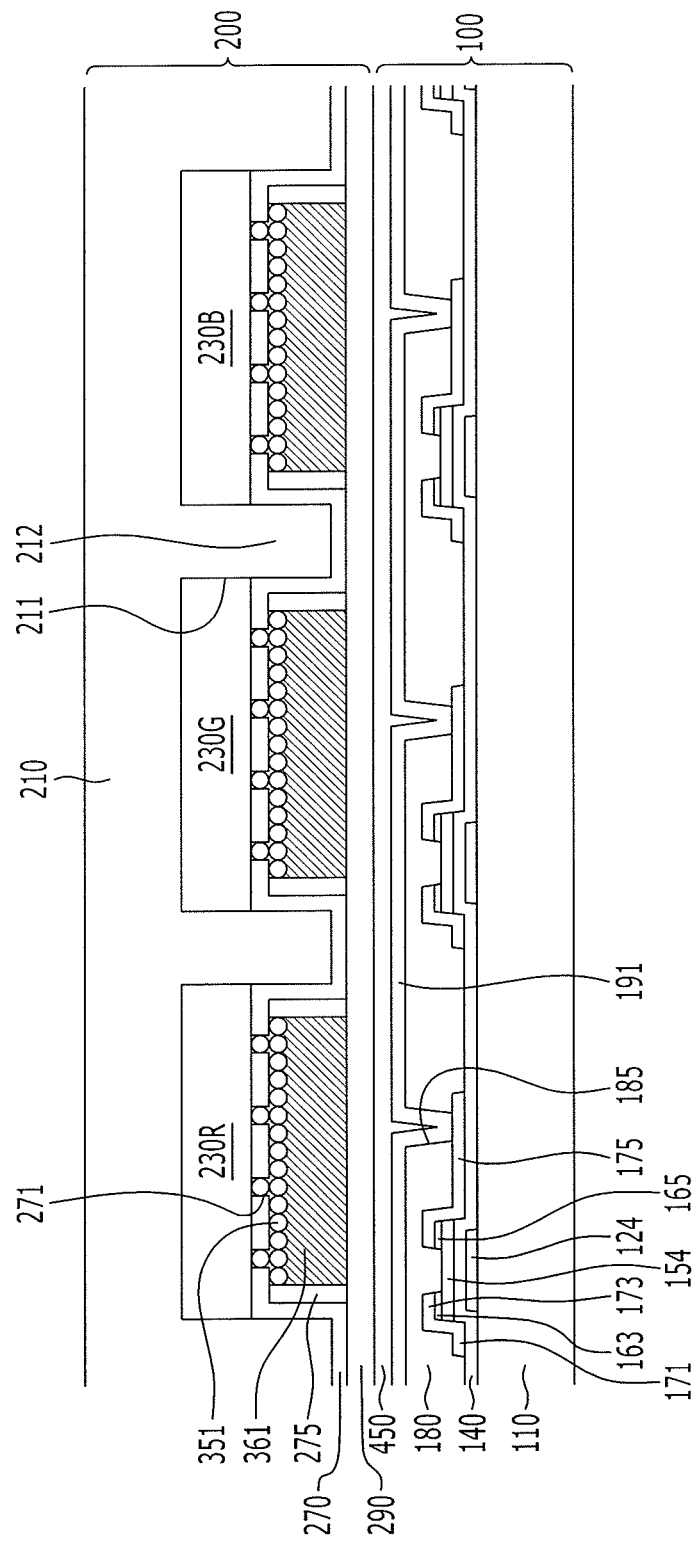

FIG. 23 to FIG. 25 are cross-sectional views of an electrophoretic display device according to an exemplary embodiment of the present invention.

As shown in FIG. 23 and FIG. 24, the electrophoretic display device according to an exemplary embodiment of the present invention uses a black solvent 361 and white electronic particles 351. In this way, the display shown in FIGS. 23 and 24 is different from the electrophoretic display device described above with reference to FIGS. 16-22, and the remaining structure shown in FIGS. 23 to 25 may be the same as the electrophoretic display device discussed above with reference to FIGS. 16-22.

The black solvent 361 and the white electronic particles 351 are formed on the common electrode 270 in the grooves 211.

As shown in FIG. 23, if the white electronic particles 351 positioned in each groove 211 are disposed at the boundary of the common electrode 270 and the black solvent 361, the external light is reflected such that each color is displayed.

As shown in FIG. 24, if the white electronic particles 351 positioned in each groove 211 are disposed at the boundary of the sealant layer 290 and the black solvent 361, the external light is not reflected such that black is displayed.

On the other hand, the electrophoretic display device according to an exemplary embodiment may not include the white reflector. In this case, as shown in FIG. 25, the first organic layer 450 of the lower panel 100 and the sealant layer 290 of the upper panel 200 may be adhered together.

Next, an electrophoretic display device according to an exemplary embodiment of the present invention will be described with reference to FIG. 26 to FIG. 28.

Figure 26:
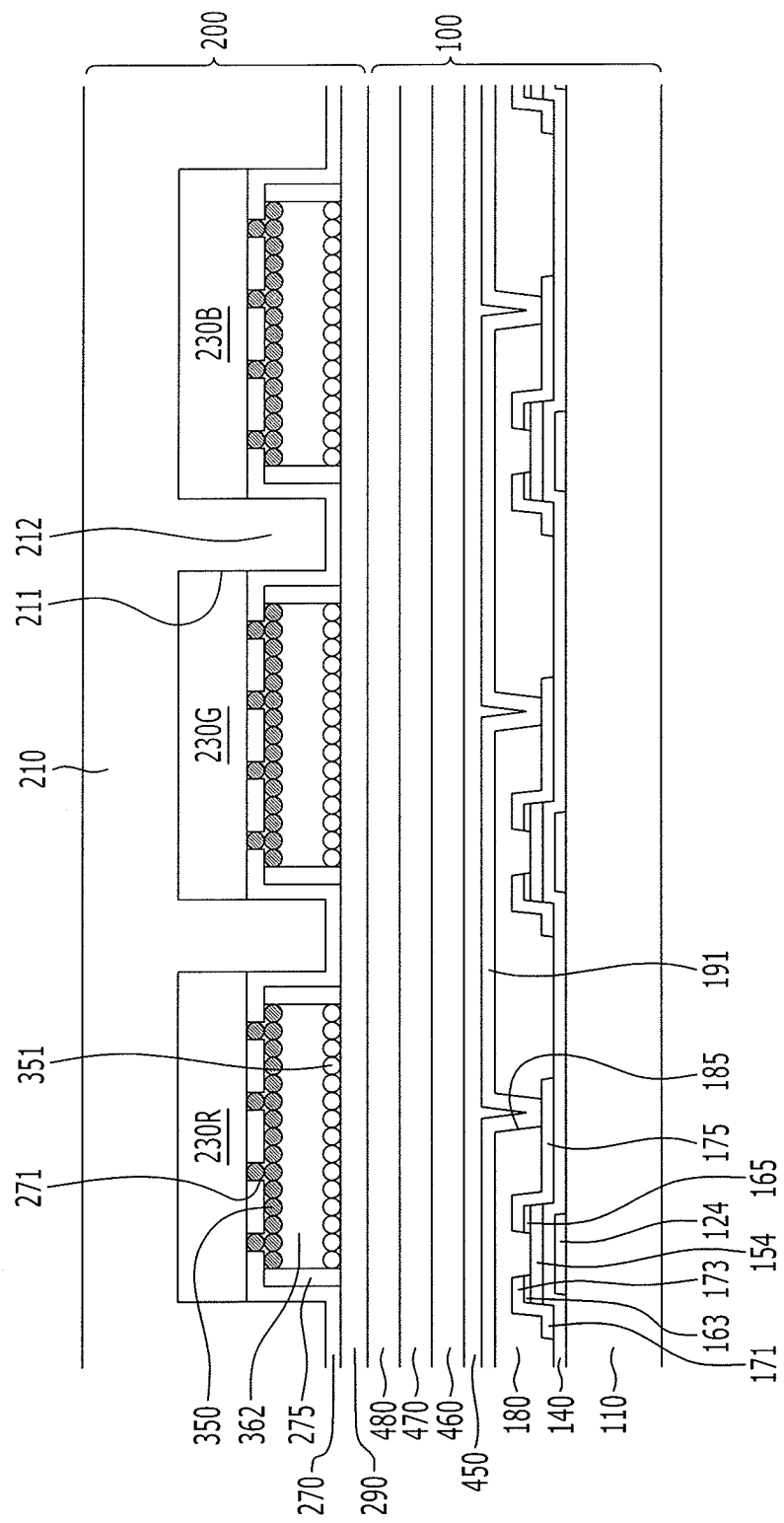
FIG. 26 to FIG. 28 are cross-sectional views of an electrophoretic display device according to an exemplary embodiment of the present invention.
Figure 27:
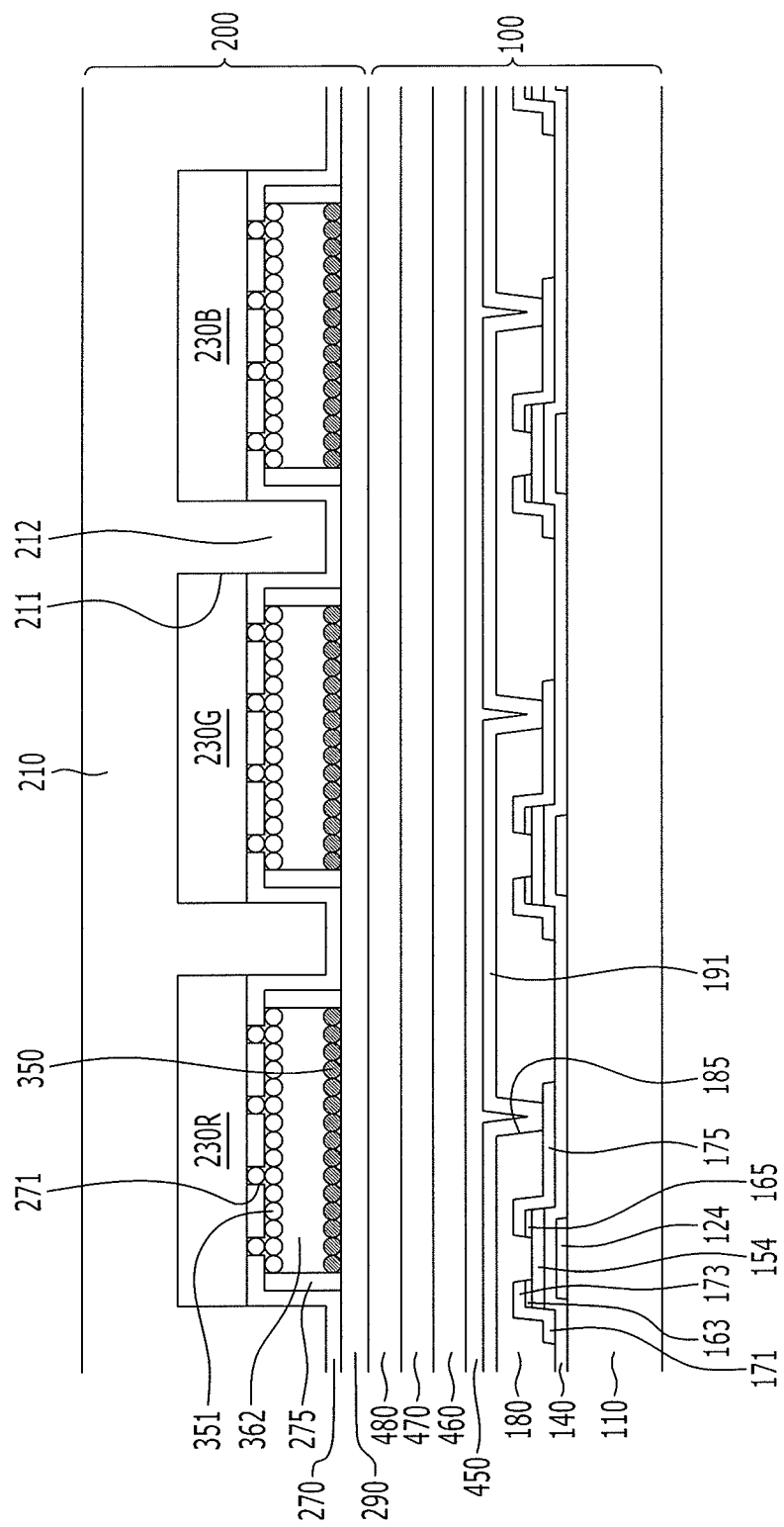
Figure 28:
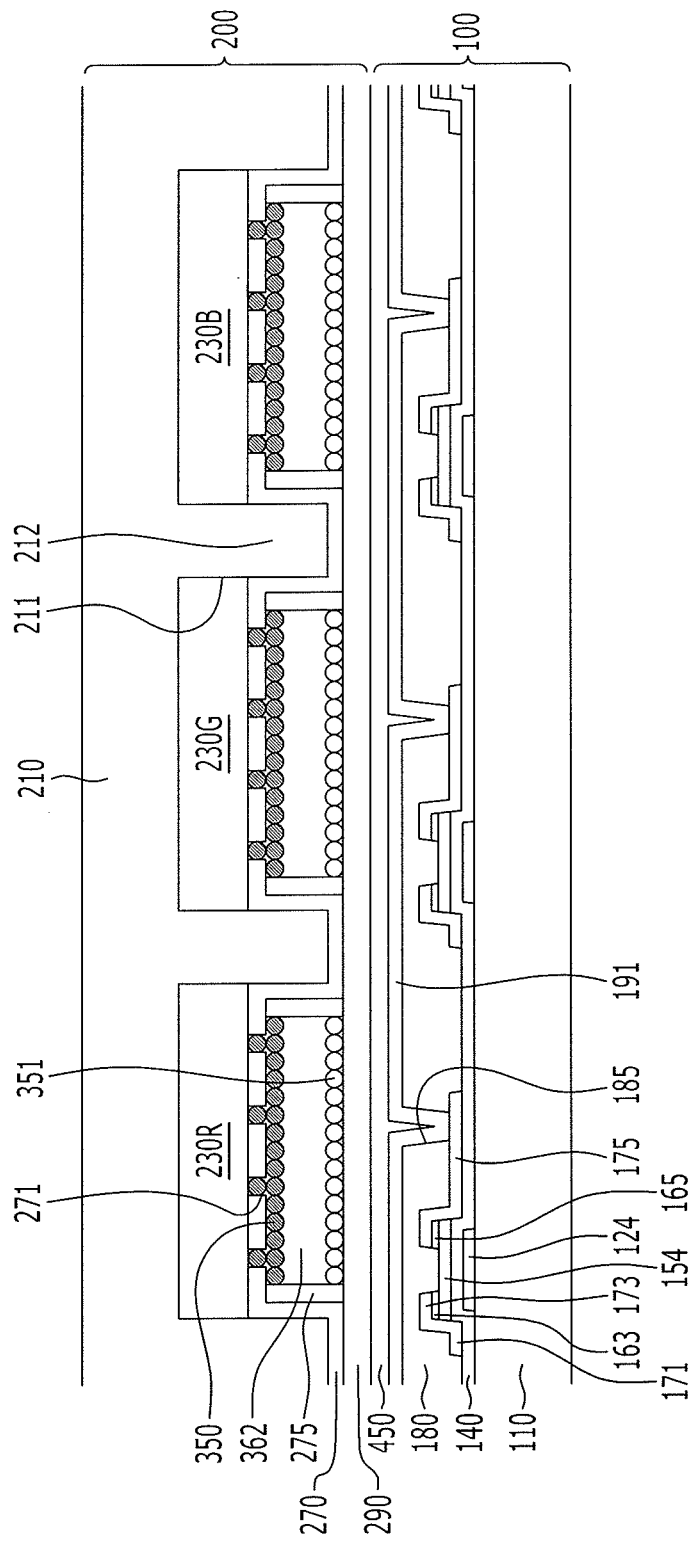

FIG. 26 to FIG. 28 are cross-sectional views of an electrophoretic display device according to an exemplary embodiment of the present invention.

As shown in FIG. 26 and FIG. 27, the electrophoretic display device according to an exemplary embodiment of the present invention uses a transparent solvent 362, the black electronic particles 350, and the white electronic particles 351, differently from the electrophoretic display device discussed above with reference to FIGS. 16-21, and the remaining structure may be the same as the electrophoretic display device discussed above with reference to FIGS. 16-21.

The transparent solvent 362, the black electronic particles 350, and the white electronic particles 351 are formed on the common electrode 270 in the grooves 211.

As shown in FIG. 26, if the black electronic particles 350 positioned in each groove 211 are disposed at the boundary of the common electrode 270 and the transparent solvent 362 and the white electronic particles 351 are disposed at the boundary of the sealant layer 290 and the transparent solvent 362, the external light is not reflected such that black is displayed.

As shown in FIG. 27, if the black electronic particles 350 positioned in each groove 211 are disposed at the boundary of the sealant layer 290 and the transparent solvent 362 and the white electronic particles 351 are disposed at the boundary of the common electrode 270 and the transparent solvent 362, the external light is reflected such that each color is displayed.

The electrophoretic display device according to an exemplary embodiment may not have the white reflector. In this case, as shown in FIG. 28, the first organic layer 450 of the lower panel 100 and the sealant layer 290 of the upper panel 200 may be adhered together.

Next, an electrophoretic display device according to an exemplary embodiment of the present invention will be described with reference to FIG. 29 and FIG. 30.

Figure 29:
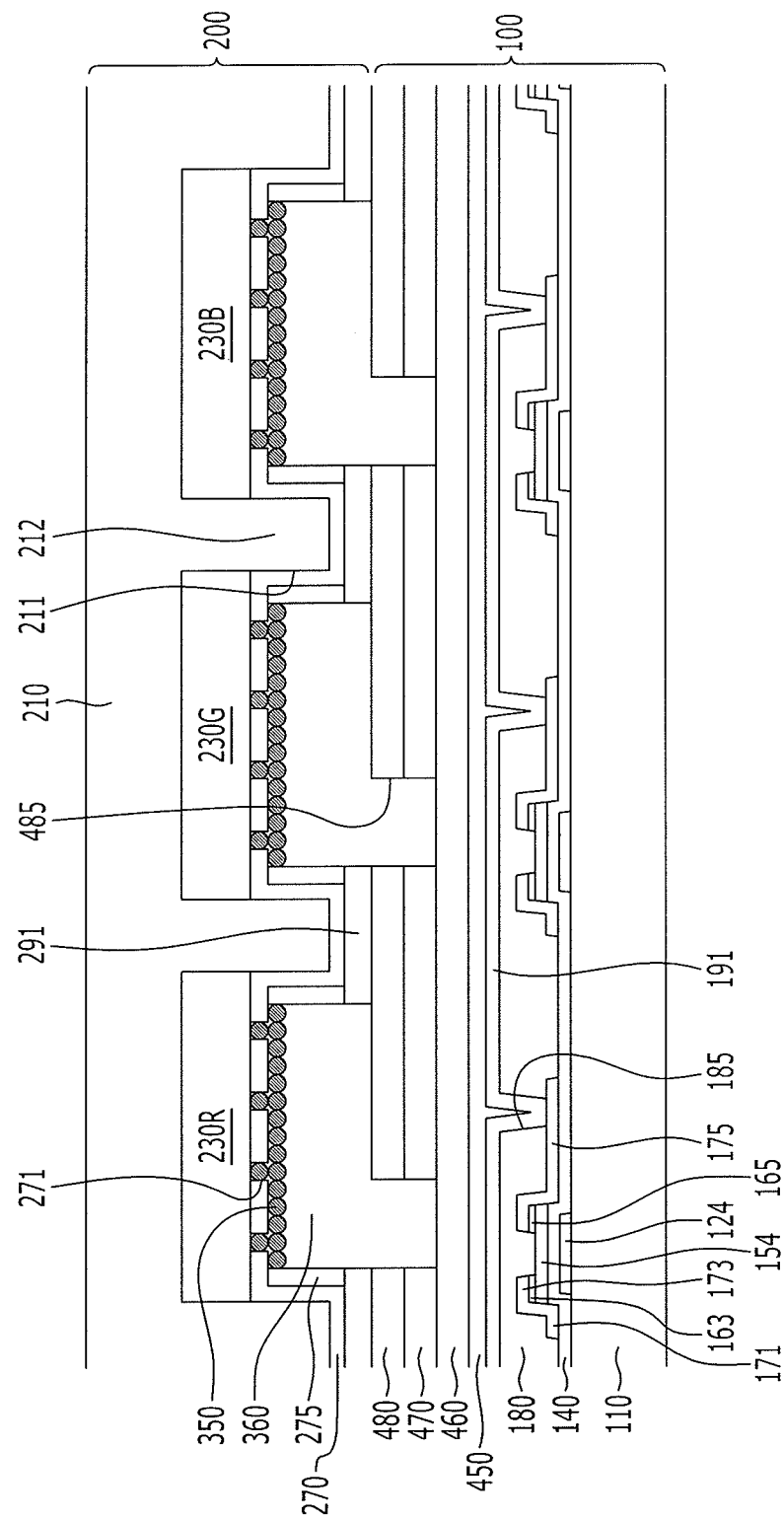
FIG. 29 and FIG. 30 are cross-sectional views of an electrophoretic display device according to an exemplary embodiment of the present invention.
Figure 30:
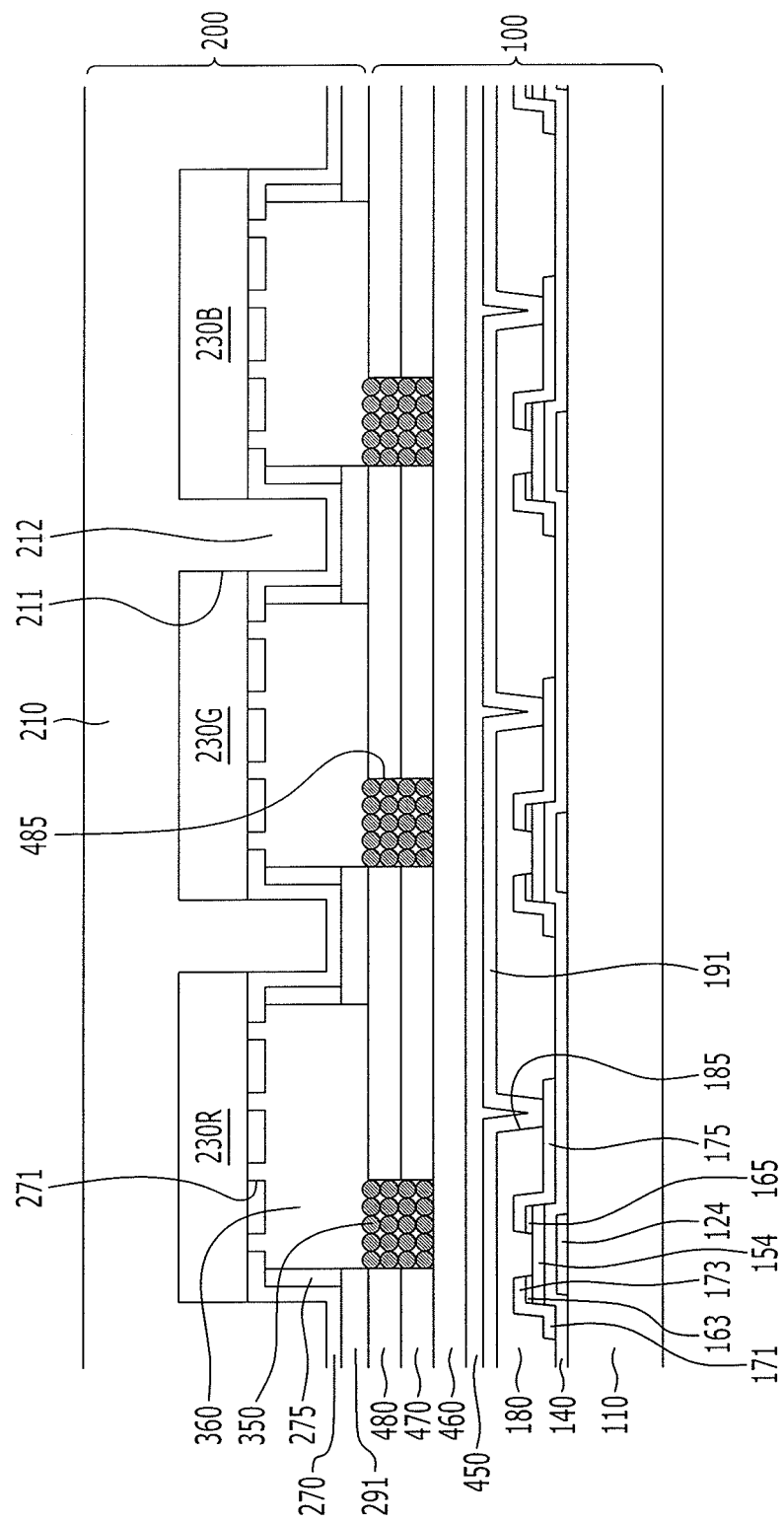

FIG. 29 and FIG. 30 are cross-sectional view of an electrophoretic display device according to an exemplary embodiment of the present invention.

As shown in FIG. 29 and FIG. 30, the electrophoretic display device according to an exemplary embodiment of the present invention includes the white reflector 480 and the second organic layer 470 having an opening 485 as well as an adhesive layer pattern 291. In this way, the electrophoretic display device here described differs as compared with the electrophoretic display device described above with reference to FIGS. 16-21, and the remaining structure may be the same as the electrophoretic display device described above with reference to FIGS. 16-21.

The white reflector 480 and the second organic layer 470 of the lower panel 100 include the opening 485, and the upper panel 200 is formed with the adhesive layer pattern 291 and is adhered to the lower panel 100. The black electronic particles 350 may be positioned in the opening 485.

As shown in FIG. 29, if the black electronic particles 350 positioned in each groove 211 are disposed at the boundary of the common electrode 270 and the transparent solvent 362, the external light is not reflected such that black is displayed.

As shown in FIG. 30, if the black electronic particles 350 positioned in each groove 211 are disposed in the opening 485, the external light is reflected such that each color is displayed.

As described above, the white reflector 480 and the second organic layer 470 of the lower panel 100 include the opening 485 and the black electronic particles 350 are positioned in the opening 485 such that reflectivity and transmittance may be increased.

Next, an electrophoretic display device according to an exemplary embodiment of the present invention will be described with reference to FIG. 31 and FIG. 32.

Figure 31:
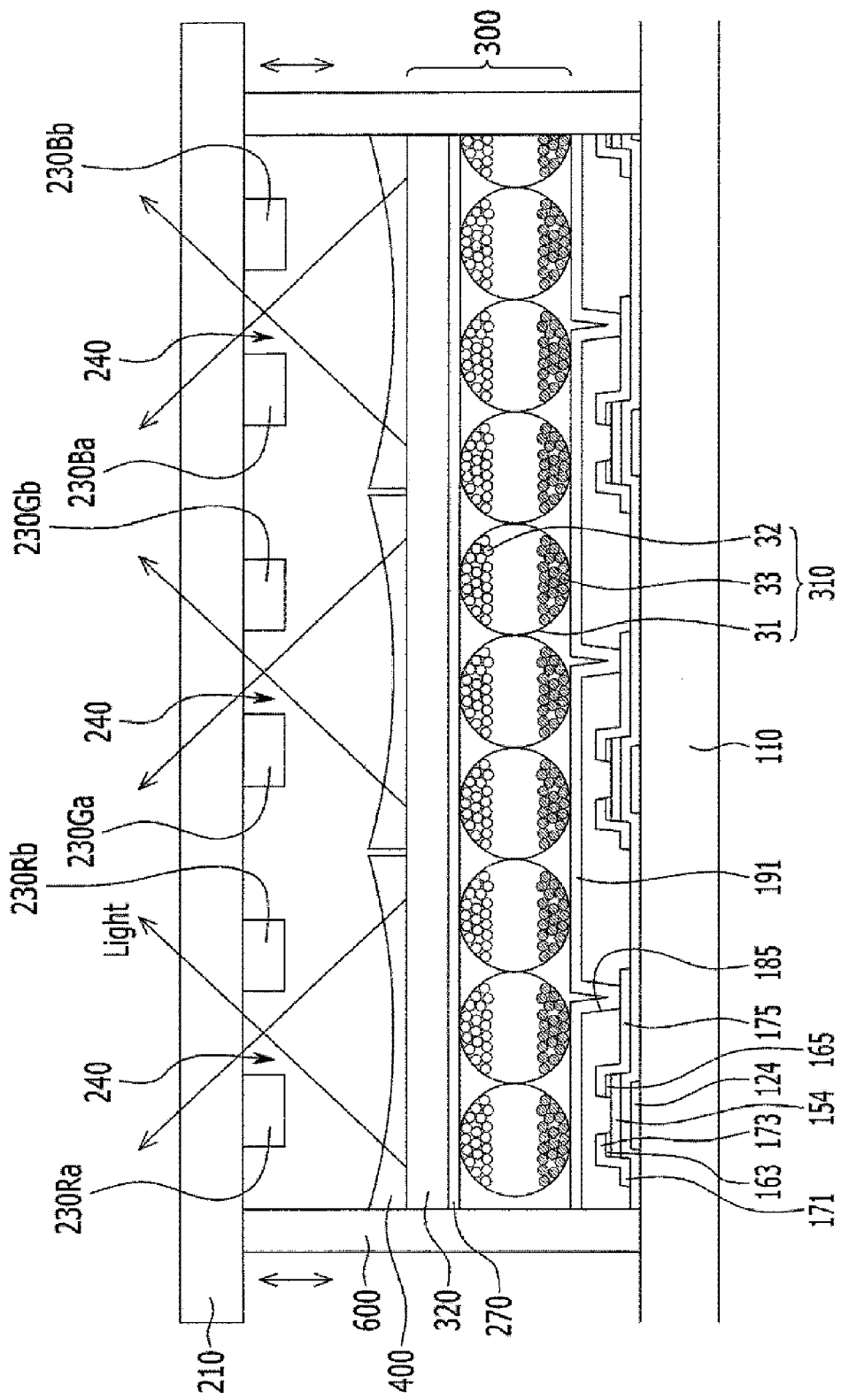
FIG. 31 and FIG. 32 are cross-sectional views of an electrophoretic display device according to an exemplary embodiment of the present invention.
Figure 32:
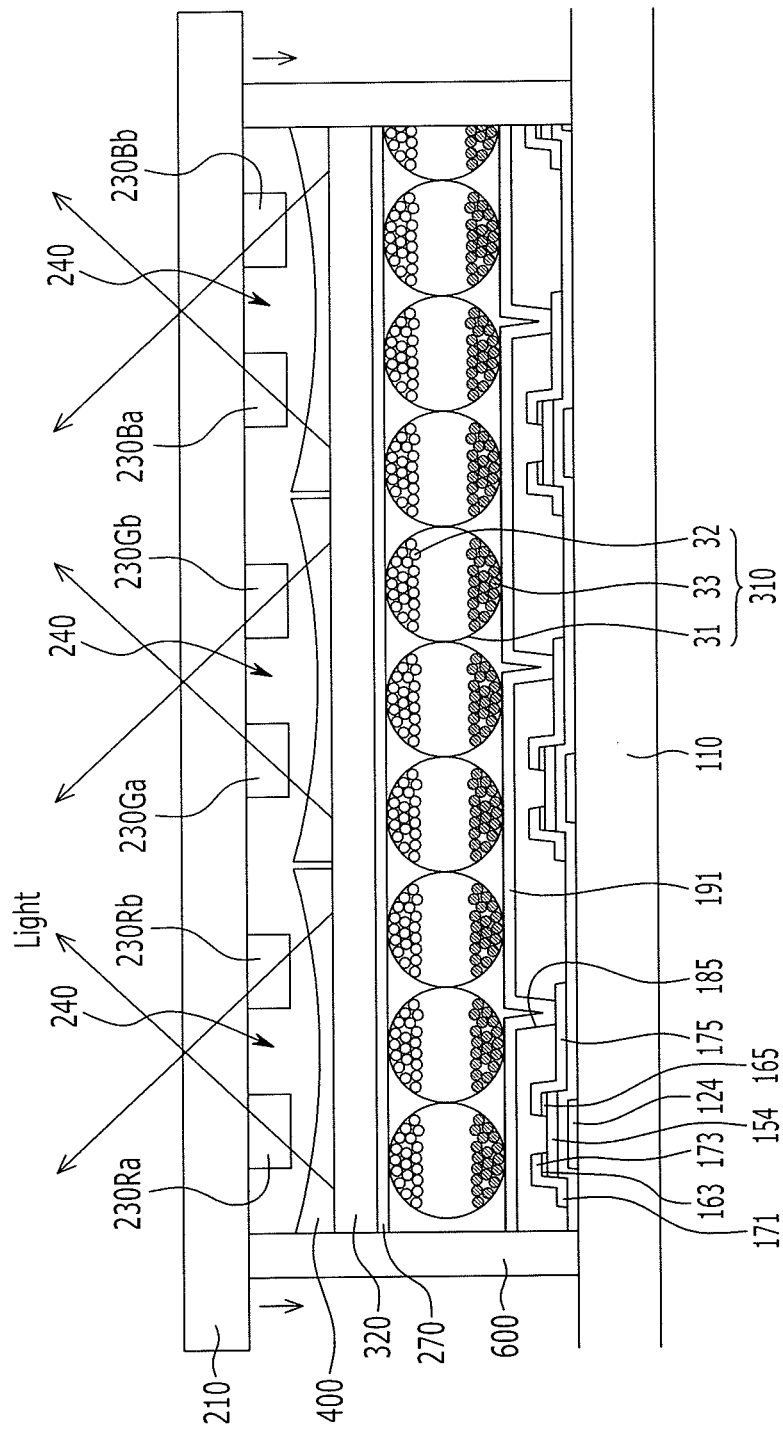

FIG. 31 and FIG. 32 are cross-sectional views of an electrophoretic display device according to an exemplary embodiment of the present invention.

As shown in FIG. 31 and FIG. 32, the electrophoretic display device according to an exemplary embodiment of the present invention includes a lens 400 on the electronic ink layer 300.

The lower panel 100 and the electronic ink layer 300 are substantially the same as the lower panel 100 and the electronic ink layer 300 of the electrophoretic display device described above with respect to FIG. 1.

The upper panel 200 includes the upper substrate 210 and the color filters 230R, 230G, and 230B formed on the upper substrate 210. Each of the color filters 230R, 230G, and 230B is respectively divided into first and second color filters 230Ra and 230Rb, 230Ga and 230Gb, and 230Ba and 230Bb, and an opening 240 is formed between the first and second color filters 230Ra and 230Rb, 230Ga and 230Gb, and 230Ba and 230Bb.

The lens 400 is formed on the electronic ink layer 300. The lens 400 is a concave lens.

A first piezoelectric member 600 is formed between the upper substrate 210 and the lower substrate 110. The first piezoelectric member 600 is made of a piezoelectric material of which the shape thereof is changed under the application of a voltage, such as PZT (Pb $(Zr_{1-x}Ti_x)O_3$). For example, the first piezoelectric member 600 may function to change the focal length of the lens 400 by controlling the interval between the upper substrate 210 and the lower substrate 110.

As shown in FIG. 31, if the first piezoelectric member 600 controls the interval between the upper substrate 210 and the lower substrate 110 such that the focal length of the lens 400 accords with the opening 240, the incident external light passing through the lens 400 is transmitted to the opening 240 between the first and second color filters 230Ra and 230Rb, 230Ga and 230Gb, and 230Ba and 230Bb.

In this case, white and black are displayed according to the position of the white positive charged particles 32 and the black negative charged particles 33 of the electronic ink layer 300.

As shown in FIG. 32, if the first piezoelectric member 600 controls the interval between the upper substrate 210 and the lower substrate 110 such that the focus region of the lens 400 accords with the upper substrate 210, the incident external light passing through the lens 400 is transmitted to the first and second color filters 230Ra and 230Rb, 230Ga and 230Gb, and 230Ba and 230Bb.

In this case, each color is realized.

As described above, the lens 400 is formed on the electronic ink layer 300 and the first piezoelectric member 600 controls the interval between the upper substrate 210 and the lower substrate 110, and thereby the black and the color may be displayed.

Next, an electrophoretic display device according to an exemplary embodiment of the present invention will be described with reference to FIG. 33 and FIG. 34.

Figure 33:
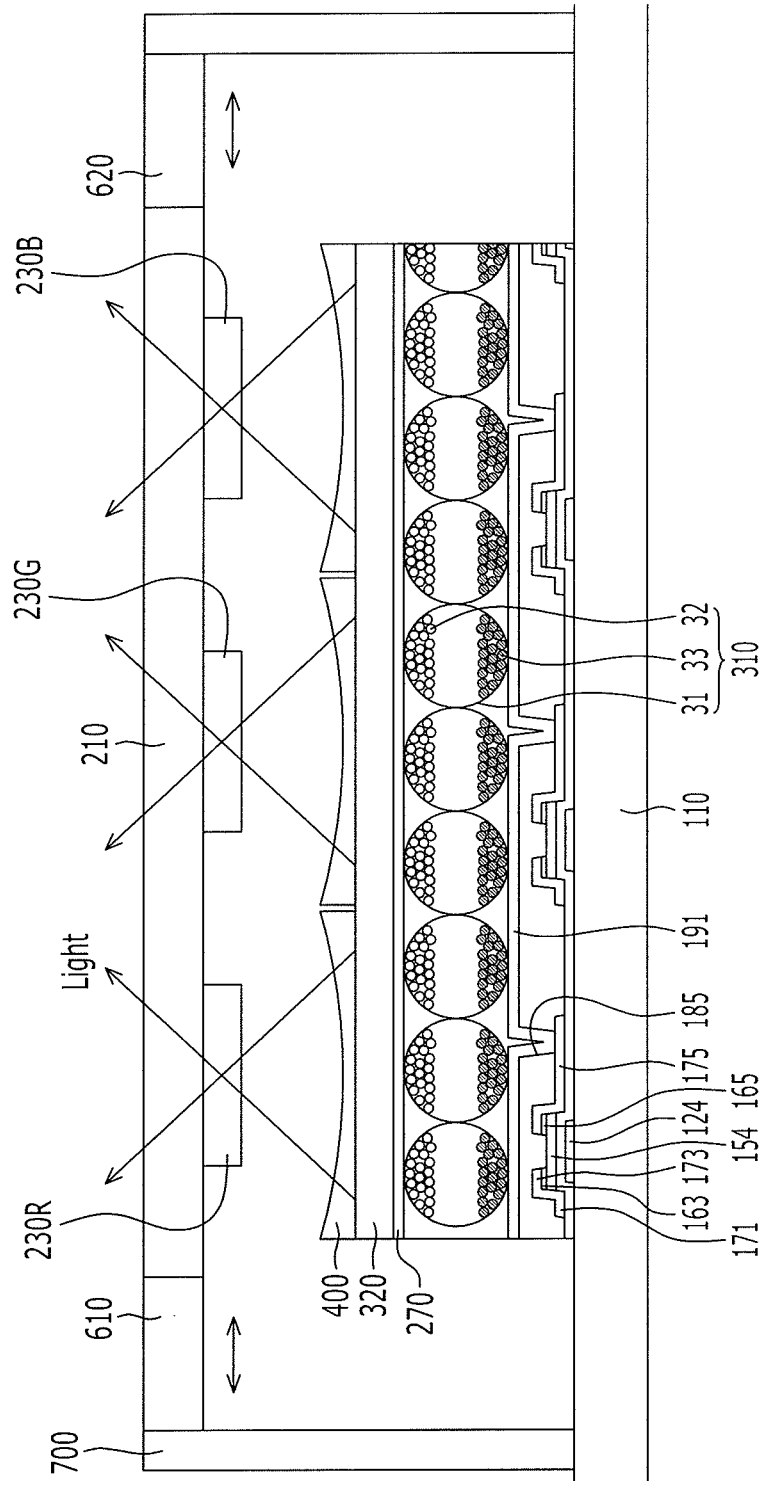
FIG. 33 and FIG. 34 are cross-sectional views of an electrophoretic display device according to an exemplary embodiment of the present invention.
Figure 34:
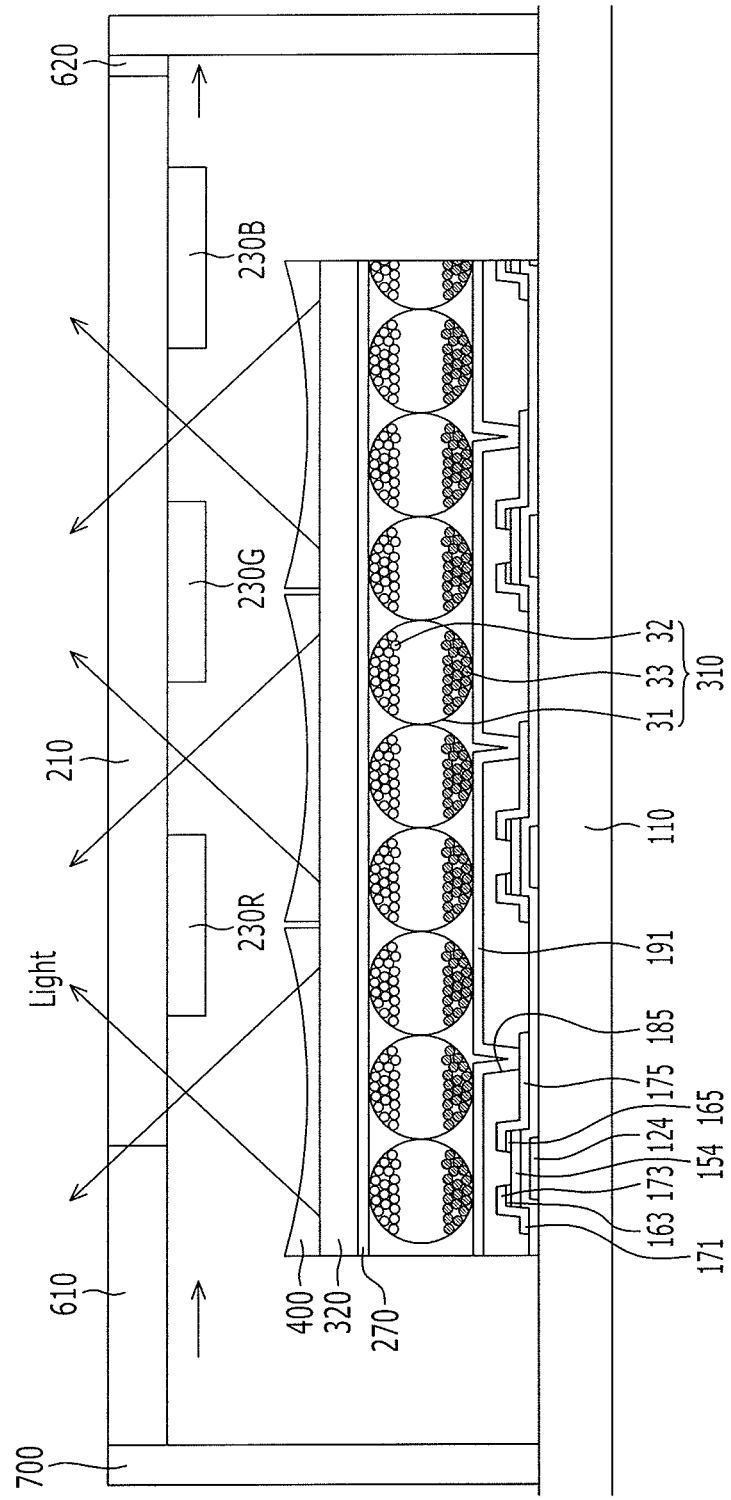

FIG. 33 and FIG. 34 are cross-sectional views of an electrophoretic display device according to an exemplary embodiment of the present invention.

As shown in FIG. 33 and FIG. 34, the electrophoretic display device according to an exemplary embodiment of the present invention moves the upper substrate 210 left and right to control the focus of the lens 400.

The structure of the lower panel 100 and the electronic ink layer 300 is substantially the same as the lower panel 100 and the electronic ink layer 300 of the electrophoretic display device described above with reference to FIGS. 31-32.

The upper panel 200 includes the upper substrate 210 and the color filters 230R, 230G, and 230B formed on the upper substrate 210. The color filters 230R, 230G, and 230B are separated from each other.

A supporting member 700 is formed on the lower substrate 210, and a second piezoelectric member 610 and a third piezoelectric member 620 are positioned between the upper substrate 210 and the supporting member 700.

The second piezoelectric member 610 and the third piezoelectric member 620 are made of a piezoelectric material of which the shape thereof is changed under the application of a voltage, such as PZT (Pb $(Zr_{1-x}Ti_x)O_3$).

As shown in FIG. 33, if the focus region of the lens 400 accords with each of the color filters 230R, 230G, and 230B, the incident external light is passed through the lens 400 and is transmitted to each of the color filters 230R, 230G, and 230B. In this case, each color is realized.

As shown in FIG. 34, the second piezoelectric member 610 is expanded and the third piezoelectric member 620 is contracted to move the upper substrate 210, and if the focus region of the lens 400 is between the color filters 230R, 230G, and 230B, the incident external light is passed through the lens 500 and is transmitted between the color filters 230R, 230G, and 230B. In this case, the white and the black are displayed according to the positions of the white positive charged particles 32 and the black negative charged particles 33 of the electronic ink layer 300.

While exemplary embodiments of the present invention have been described with reference to the figures, it is to be understood that the invention is not limited to the disclosed embodiments.

What is claimed is:

1. An electrophoretic display device, comprising:
a lower substrate;
an upper substrate;
a thin film transistor disposed on the lower substrate;
a pixel electrode connected to the thin film transistor;
an electronic ink layer positioned between the lower substrate and the upper substrate;
a plurality of partitions disposed on the upper substrate;
a reflecting layer disposed on the partitions; and
a color filter disposed between adjacent partitions of the plurality of partitions.

2. The electrophoretic display device of claim 1, wherein the electronic ink layer includes:
a plurality of spherical microcapsules; and
a supporting layer supporting the plurality of spherical microcapsules, wherein each of the plurality of spherical microcapsules includes a plurality of white charged particles or a plurality of black charged particles disposed therein.

3. The electrophoretic display device of claim 2, wherein each of the plurality of spherical microcapsules includes a plurality of white charged particles and a plurality of black charged particles and the white charged particles and the black charged particles are charged with opposite polarities.

4. The electrophoretic display device of claim 2, wherein the electronic ink layer further includes a common electrode disposed on the microcapsules.

5. The electrophoretic display device of claim 2, further comprising a groove disposed at the upper substrate between the partitions.

6. The electrophoretic display device of claim 5, wherein the color filter is positioned at the groove.

7. The electrophoretic display device of claim 1, wherein the height of each of the plurality of partitions is in the range of 20 to 25 μm.

8. The electrophoretic display device of claim 1, wherein the reflecting layer is made of a metal having high reflectivity.

9. The electrophoretic display device of claim 1, wherein each of the plurality of partitions is made of a white photosensitive film.

10. The electrophoretic display device of claim 1, wherein each of the plurality of partitions is made of a black photosensitive film.

11. The electrophoretic display device of claim 1, further comprising an adhesive layer disposed on the reflecting layer and the color filter, wherein the adhesive layer is applied as a liquid adhesive and adheres an upper panel comprising the upper substrate, the plurality of partitions, the reflecting layer, and the color filter to the electronic ink layer.

12. The electrophoretic display device of claim 11, wherein the thickness of the adhesive layer is in the range of 20 to 25 μm.

13. A method for manufacturing an electrophoretic display device, comprising:
    forming a thin film transistor on a lower substrate;
    forming a pixel electrode connected to the thin film transistor;
    forming an electronic ink layer on the pixel electrode;
    etching an upper substrate to form a groove and a partition;
    forming a reflecting layer on the partition; forming a color filter in the groove;
    forming an adhesive layer on the reflecting layer and the color filter; and
    adhering the adhesive layer to the electronic ink layer.

14. The method of claim 13, wherein the etching of the upper substrate to form the groove and the partition includes:
    forming a metal pattern on the upper substrate;
    forming a first photosensitive film on the metal pattern; and
    etching the upper substrate by using the first photosensitive film as a mask.

15. The method of claim 14, wherein the forming of the reflecting layer on the partition include
    surface-treating an interior of the groove to form a surface treated portion thereof;
    forming a second photosensitive film on the surface treated portion of the groove;
    forming the reflecting layer on the second photosensitive film and the partition; and
    removing the reflecting layer on the second photosensitive film and the second photosensitive film.

16. The method of claim 13, wherein the electronic ink layer includes:
    a plurality of spherical microcapsules; and
    a supporting layer supporting the plurality of spherical microcapsules, wherein each of the plurality of spherical microcapsules includes a plurality of white charged particles or a plurality of black charged particles disposed therein.

17. The method of claim 16, wherein each of the plurality of spherical microcapsules includes a plurality of white charged particles and a plurality of black charged particles and the white charged particles and the black charged particles are charged with opposite polarities.

18. The method of claim 16, wherein the electronic ink layer further includes a common electrode formed on the plurality of microcapsules.

19. An electrophoretic display device, comprising:
    a lower substrate;
    a thin film transistor disposed on the lower substrate;
    a pixel electrode connected to the thin film transistor;
    an upper substrate facing the lower substrate and including a plurality of partitions and a plurality of grooves disposed between the partitions; a common electrode disposed on the grooves and the partitions;
    a lateral reflector disposed on the common electrode on the partitions;
    color filters disposed in the grooves; and a plurality of electrically charged particles disposed on the color filters.

20. The electrophoretic display device of claim 19, wherein the common electrode includes a plurality of cutouts.

21. The electrophoretic display device of claim 19, further comprising a first organic layer disposed on the pixel electrode.

22. The electrophoretic display device of claim 21, further comprising a white reflector disposed on the first organic layer.

23. The electrophoretic display device of claim 22, wherein the white reflector includes an opening.

24. The electrophoretic display device of claim 19, wherein the electrically charged particles are black and the device further comprises a white solvent positioned in the grooves.

25. The electrophoretic display device of claim 19, wherein the electrically charged particles are white and the device further comprises a black solvent positioned in the grooves.

26. The electrophoretic display device of claim 19, wherein the electrically charged particles include white electrically charged particles and black electrically charged particles, and the device further comprises a transparent solvent positioned in the grooves.

27. An electrophoretic display device comprising:
    a lower substrate;
    an upper substrate;
    a thin film transistor disposed on the lower substrate;
    a pixel electrode connected to the thin film transistor;
    an electronic ink layer positioned on the pixel electrode between the lower substrate and the upper substrate;
    a lens positioned on the electronic ink layer; and
    a plurality of color filters disposed on the upper substrate.

28. The electrophoretic display device of claim 27, wherein the electronic ink layer includes:
    a plurality of spherical microcapsules; and
    a supporting layer supporting the plurality of spherical microcapsules,
    wherein each of the plurality of spherical microcapsules includes a plurality of white charged particles or a plurality of black charged particles disposed therein.

29. The electrophoretic display device of claim 27, wherein the electronic ink layer includes:
- a plurality of spherical microcapsules; and
- a supporting layer supporting the plurality of spherical microcapsules,
- wherein each of the plurality of spherical microcapsules includes a plurality of white charged particles and a plurality of black charged particles and the white charged particles and the black charged particles are charged with opposite polarities.

30. The electrophoretic display device of claim 29, wherein the electronic ink layer further includes a common electrode disposed on the plurality of spherical microcapsules.

31. The electrophoretic display device of claim 29, further comprising a piezoelectric member positioned between the supporting layer and the upper substrate.

32. The electrophoretic display device of claim 27, wherein the plurality of color filters include a first color filter and a second color filter.

33. The electrophoretic display device of claim 32, further comprising an opening positioned between the first color filter and the second color filter.

34. The electrophoretic display device of claim 27, wherein each of the plurality of color filters is separated from other color filters of the plurality of color filters.

35. The electrophoretic display device of claim 34, further comprising a supporting member positioned on the lower substrate.

36. The electrophoretic display device of claim 35, further comprising a piezoelectric member positioned between the supporting member and the upper substrate.

* * * * *